Figure 1:
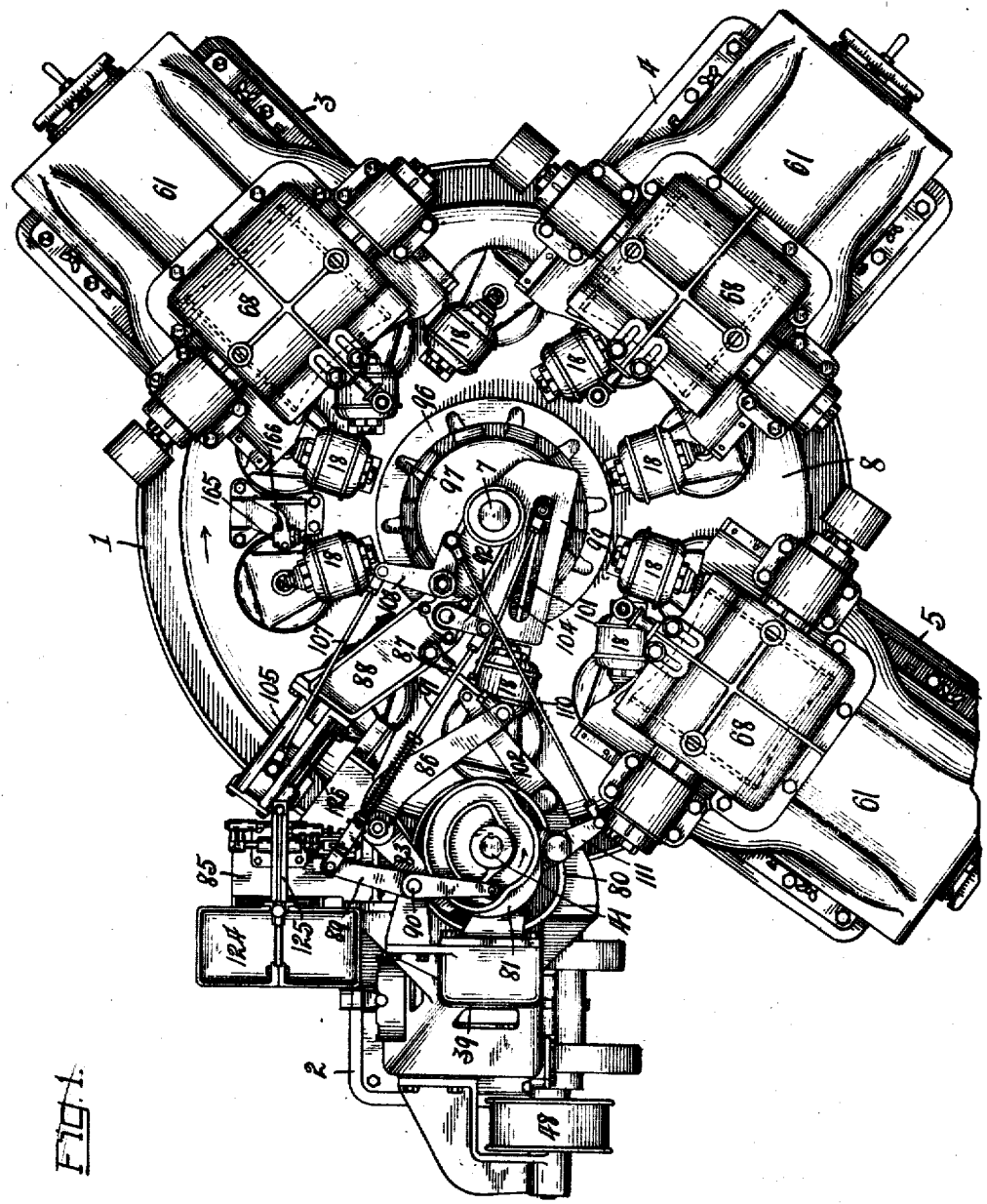

W. E. BOCK.
HEAD GRINDING MACHINE.
APPLICATION FILED JULY 24, 1917.

1,319,921.

Patented Oct. 28, 1919.
15 SHEETS—SHEET 1.

INVENTOR
William Emil Bock.
By Owen, Owen & Crampton,
His attys.

W. E. BOCK.
HEAD GRINDING MACHINE.
APPLICATION FILED JULY 24, 1917.

1,319,921.

Patented Oct. 28, 1919.
15 SHEETS—SHEET 4.

INVENTOR
William Emil Bock,
By Owen, Owen & Crampton,
His attys.

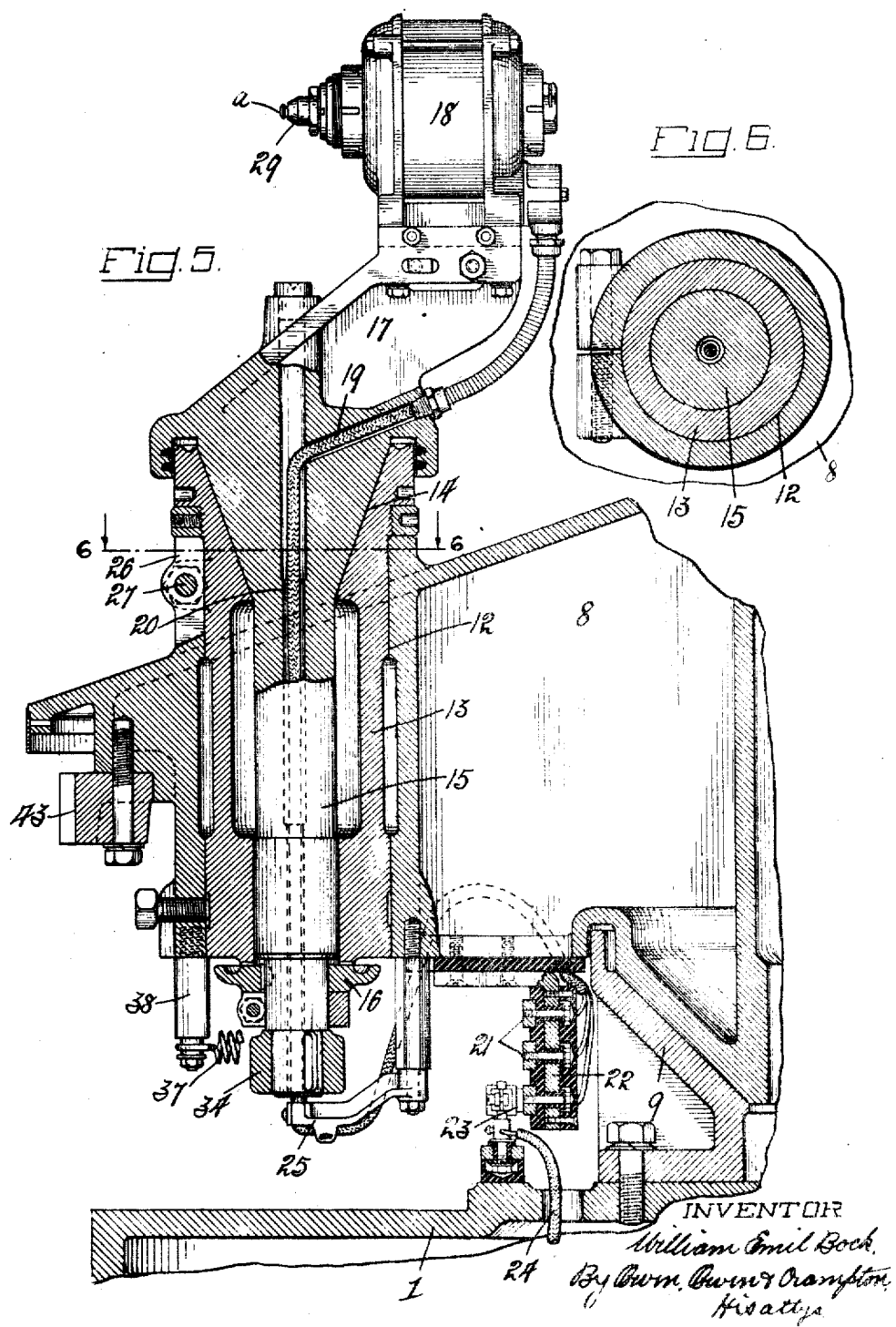

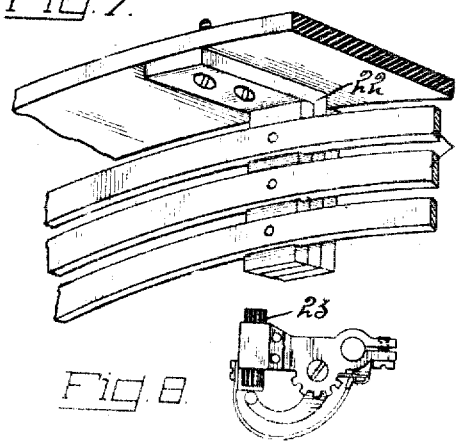
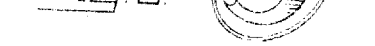
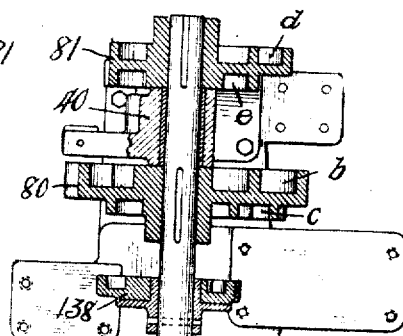
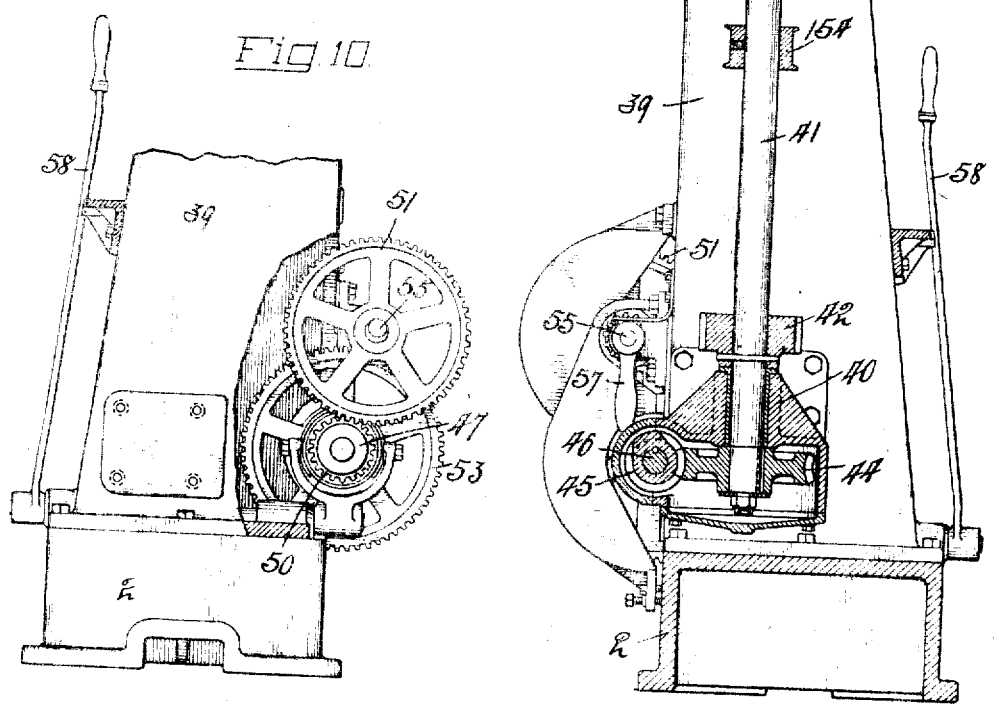

W. E. BOCK.
HEAD GRINDING MACHINE.
APPLICATION FILED JULY 24, 1917

1,319,921.

Patented Oct. 28, 1919.
15 SHEETS—SHEET 7.

INVENTOR
William Emil Bock.
By Owen, Owen & Crampton.
His attys.

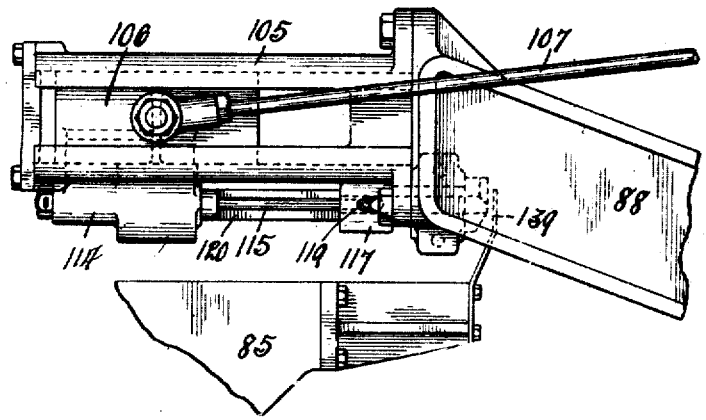
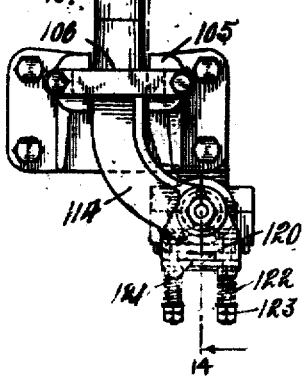
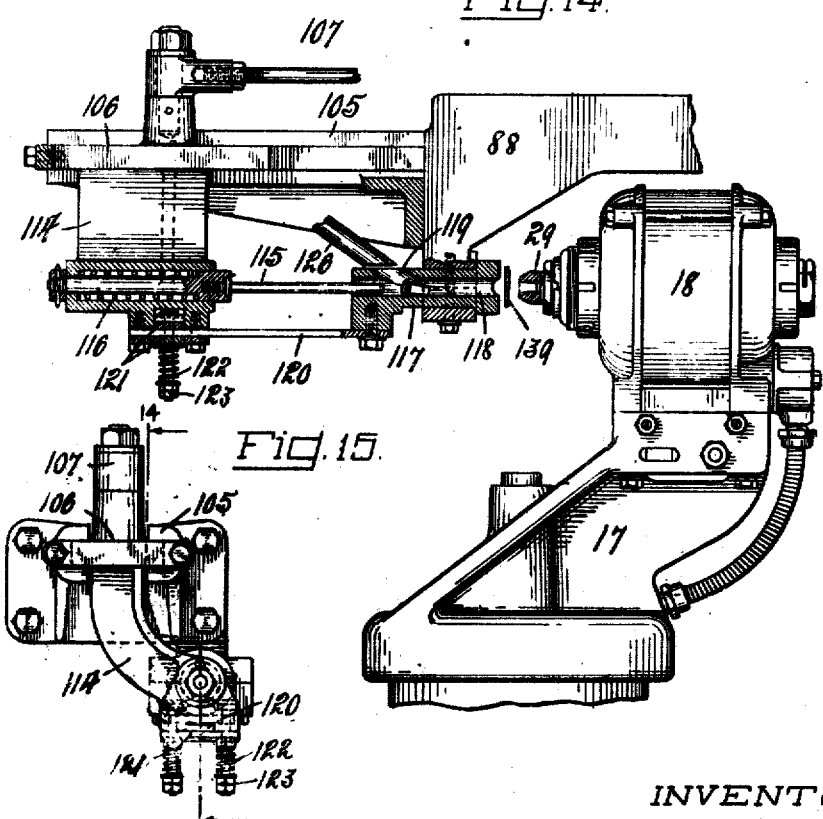

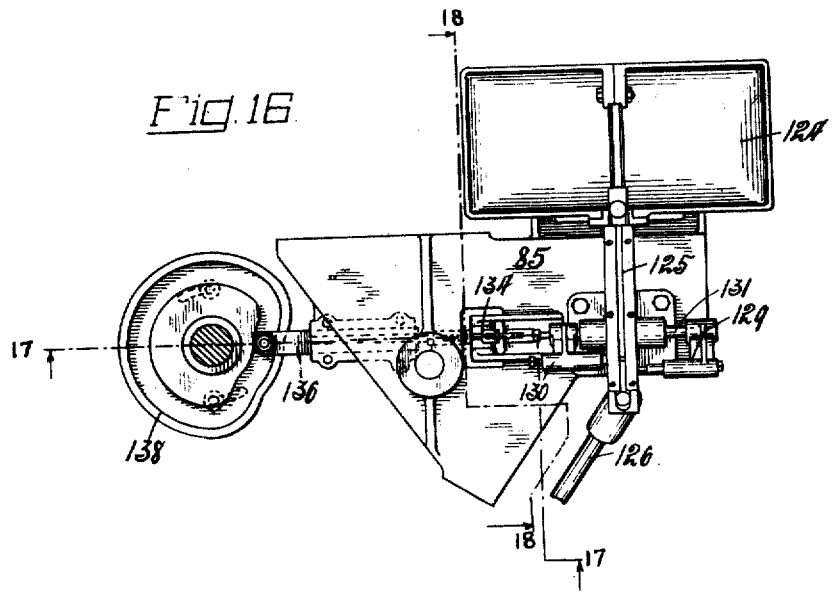
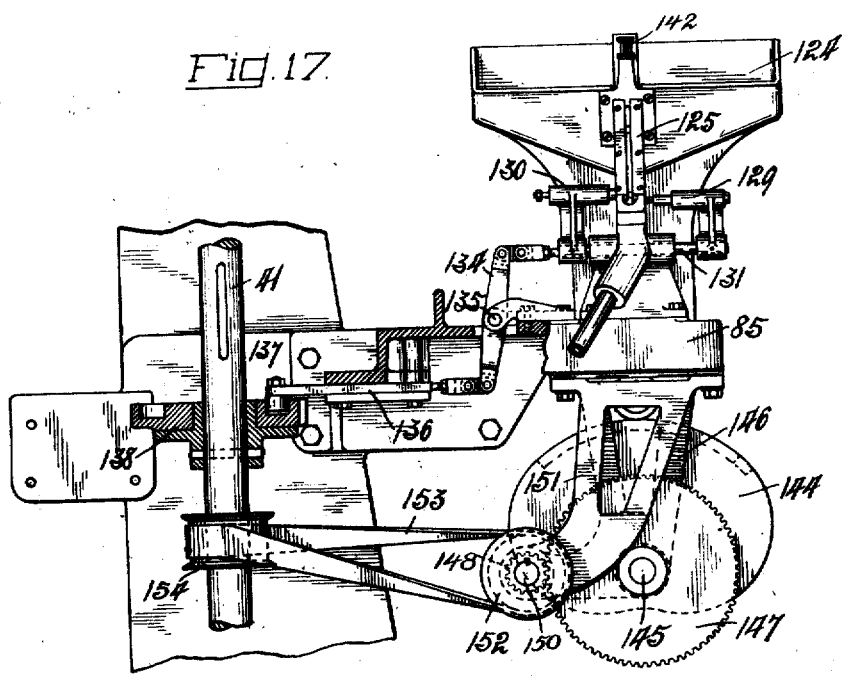

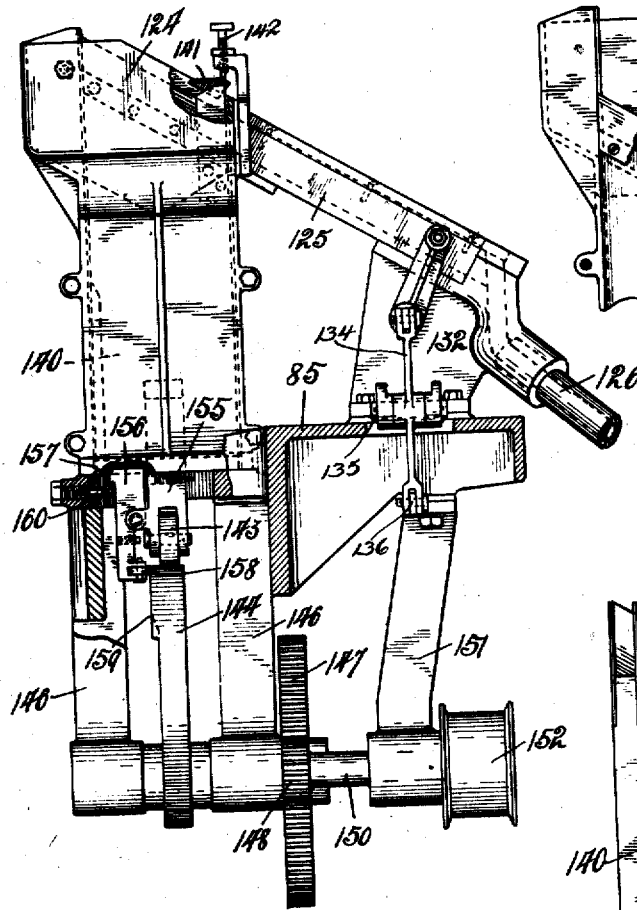

W. E. BOCK.
HEAD GRINDING MACHINE.
APPLICATION FILED JULY 24, 1917.

1,319,921.

Patented Oct. 28, 1919.
15 SHEETS—SHEET 11.

INVENTOR
William Emil Bock.
By Owen, Owen & Crampton.
His attys

W. E. BOCK.
HEAD GRINDING MACHINE.
APPLICATION FILED JULY 24, 1917.

1,319,921.

Patented Oct. 28, 1919.
15 SHEETS—SHEET 13.

INVENTOR
William Emil Bock.
By Owen, Owen & Crampton,
His attys.

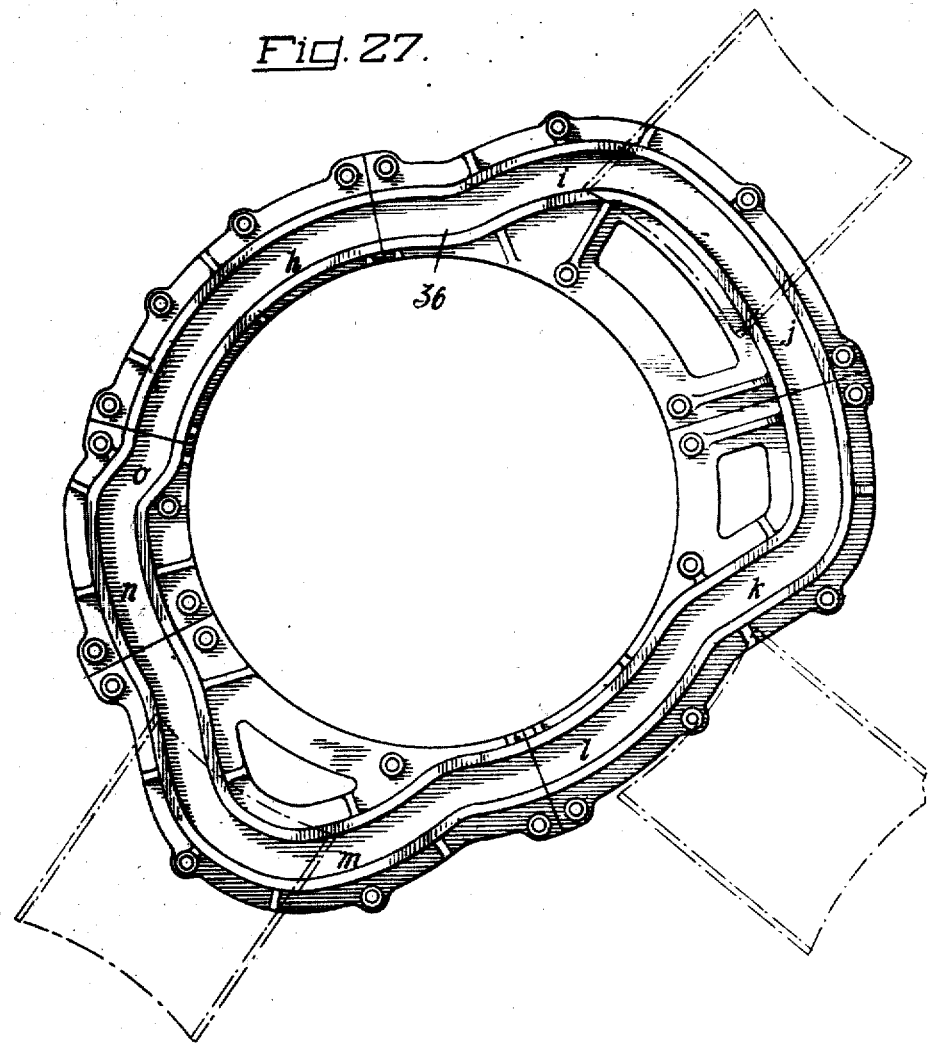

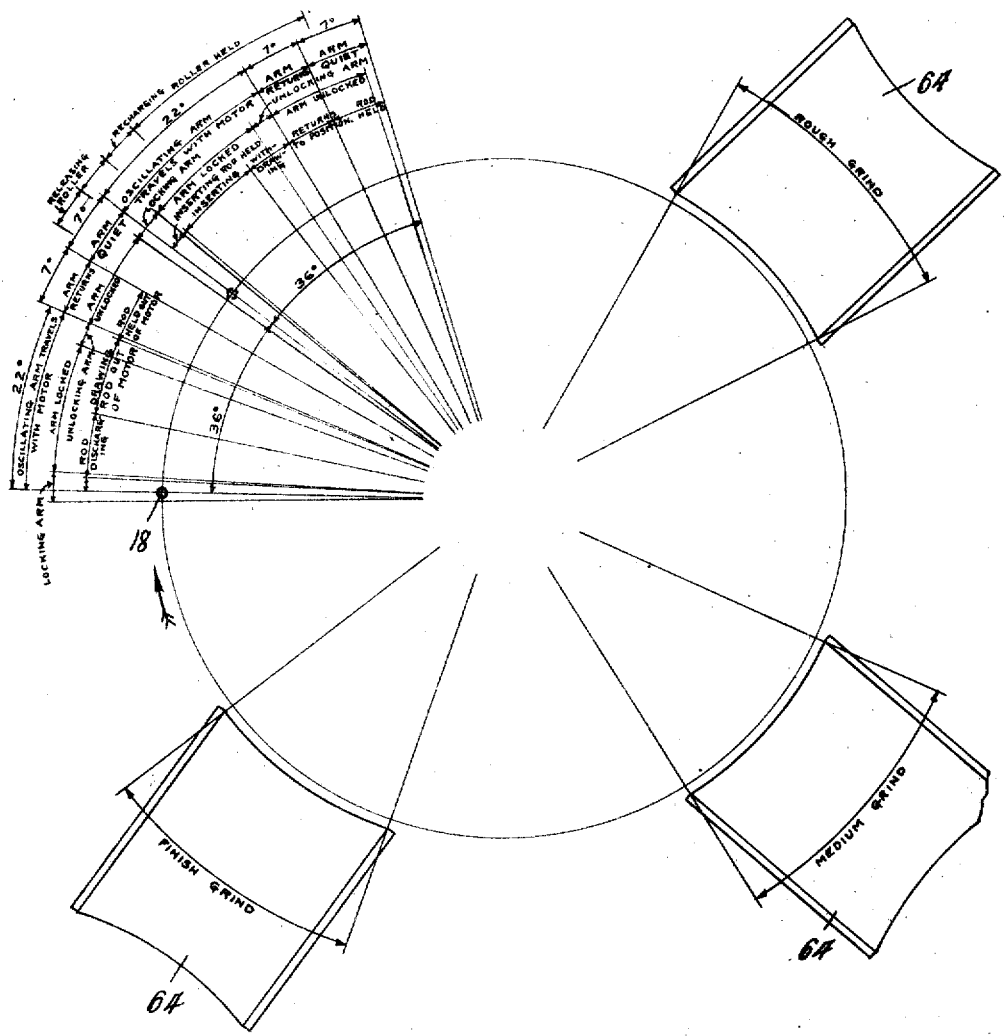

UNITED STATES PATENT OFFICE.

WILLIAM EMIL BOCK, OF TOLEDO, OHIO, ASSIGNOR TO THE BOCK BEARING COMPANY, OF TOLEDO, OHIO, A CORPORATION OF OHIO.

HEAD-GRINDING MACHINE.

1,319,921.   Specification of Letters Patent.   Patented Oct. 28, 1919.

Application filed July 24, 1917. Serial No. 182,418.

*To all whom it may concern:*

Be it known that I, WILLIAM EMIL BOCK, a citizen of the United States, and a resident of Toledo, in the county of Lucas and State of Ohio, have invented a certain new and useful Head-Grinding Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to grinding or abrading machines, and particularly to a machine of this character adapted to grind and polish the head ends of roller bearings or other articles in convex or hemispherical form.

The primary object of my invention is the provision of a machine of the character described having a plurality of article holding members which successively move into working relation to one or more shaping, abrading or polishing elements and have predetermined orbital movements relative thereto, after which each member discharges the article which has been acted on and receives another to be acted on.

A further object of the invention is the provision of simple and efficient mechanism for discharging an article from and introducing another article into each holding member at predetermined points in a continuous movement of the same in one direction. Further objects and advantages of the invention will be apparent from the following detailed description thereof.

While the invention, in its broader aspect, is capable of embodiment in numerous forms, a preferred embodiment of the parts and general assembly thereof is illustrated in the accompanying drawings, in which,—

Figure 2:
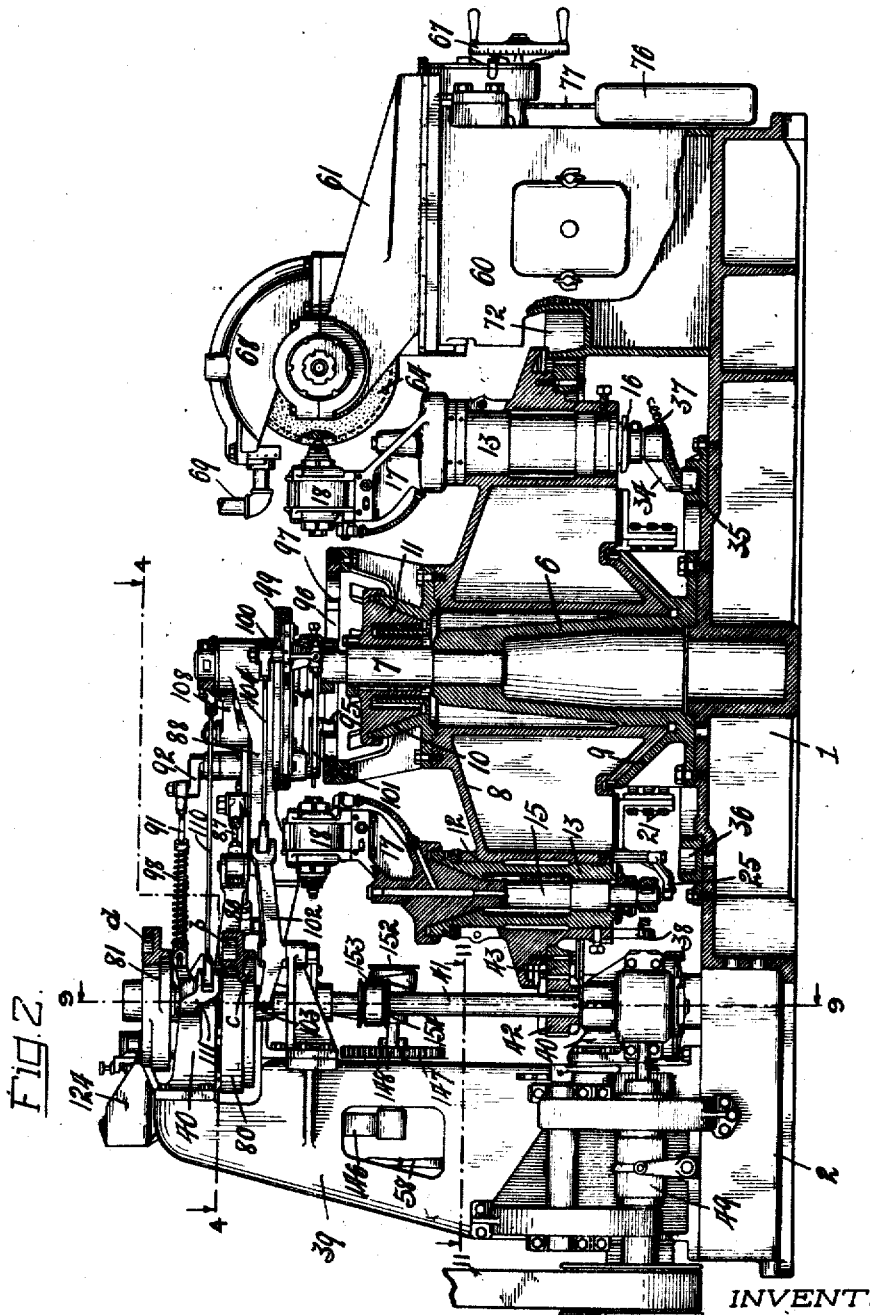
Figure 3:
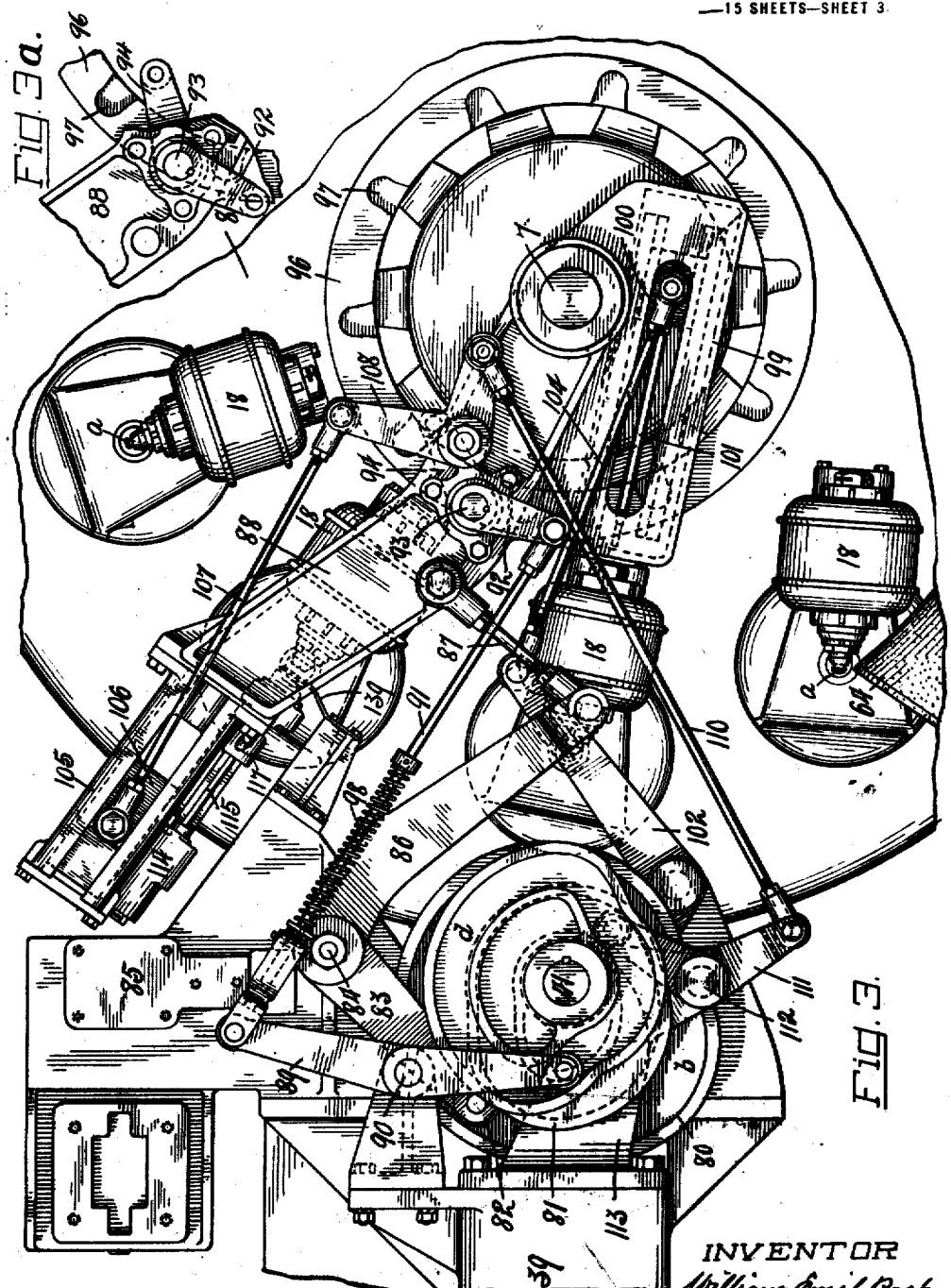
Figure 4:
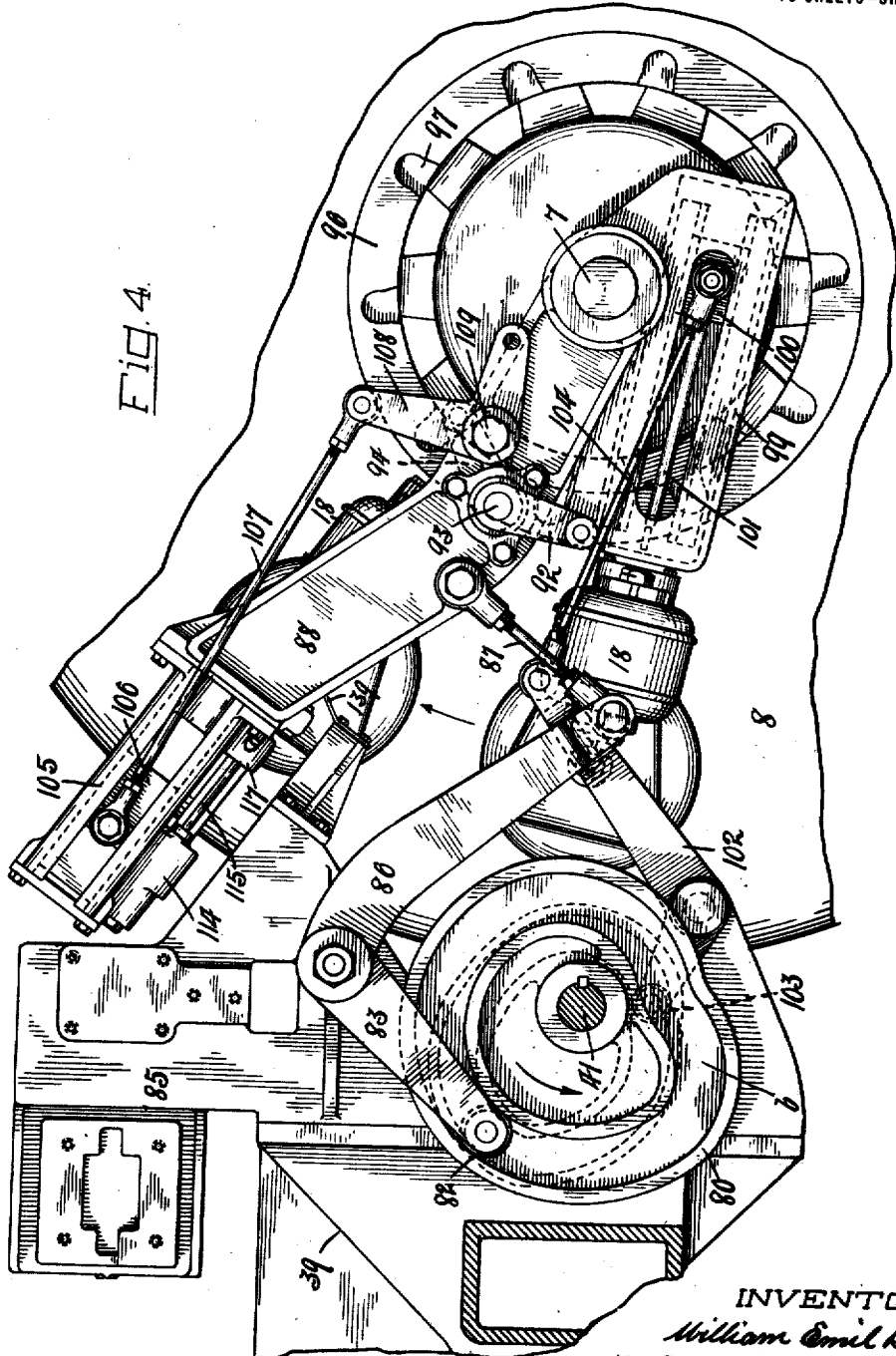
Figure 11:
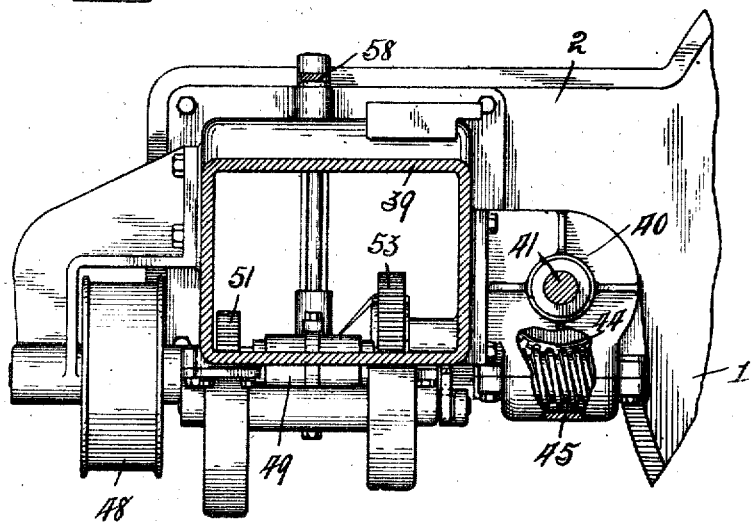
Figure 12:
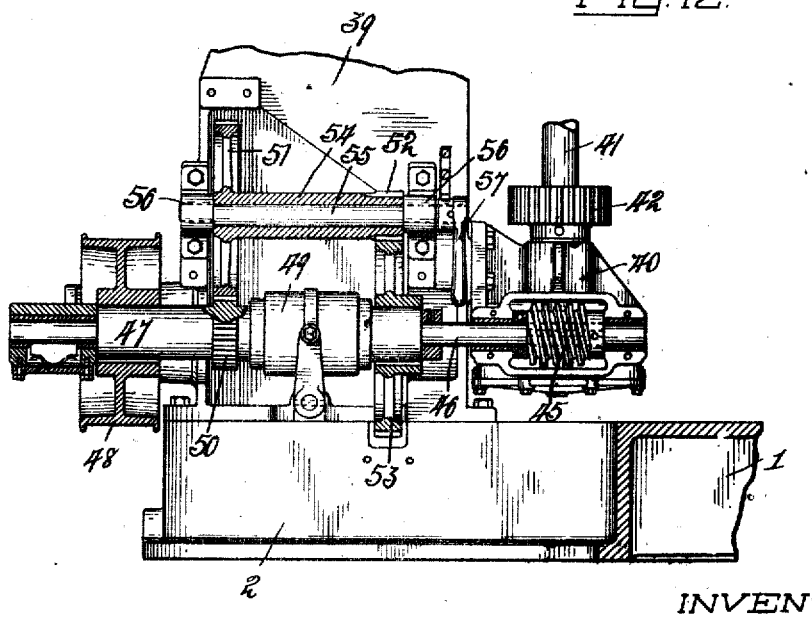
Figure 22:
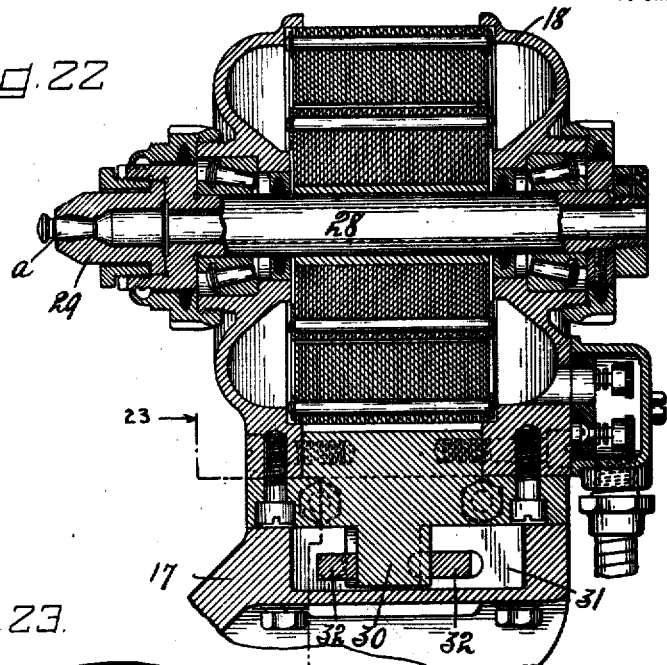
Figure 23:
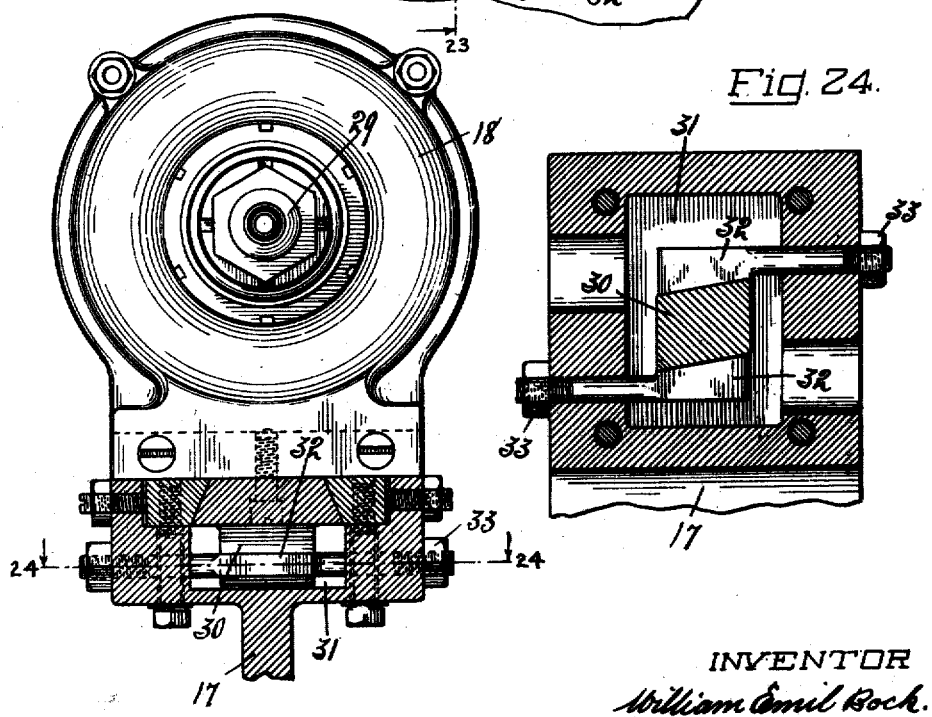
Figure 24:
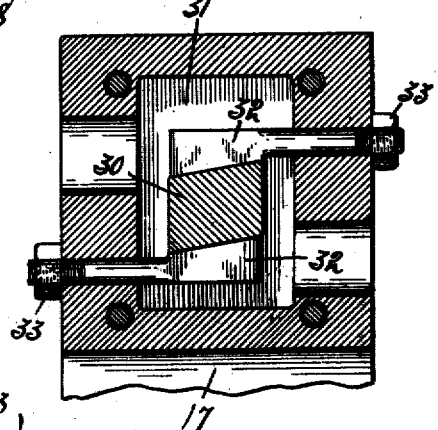
Figure 25:
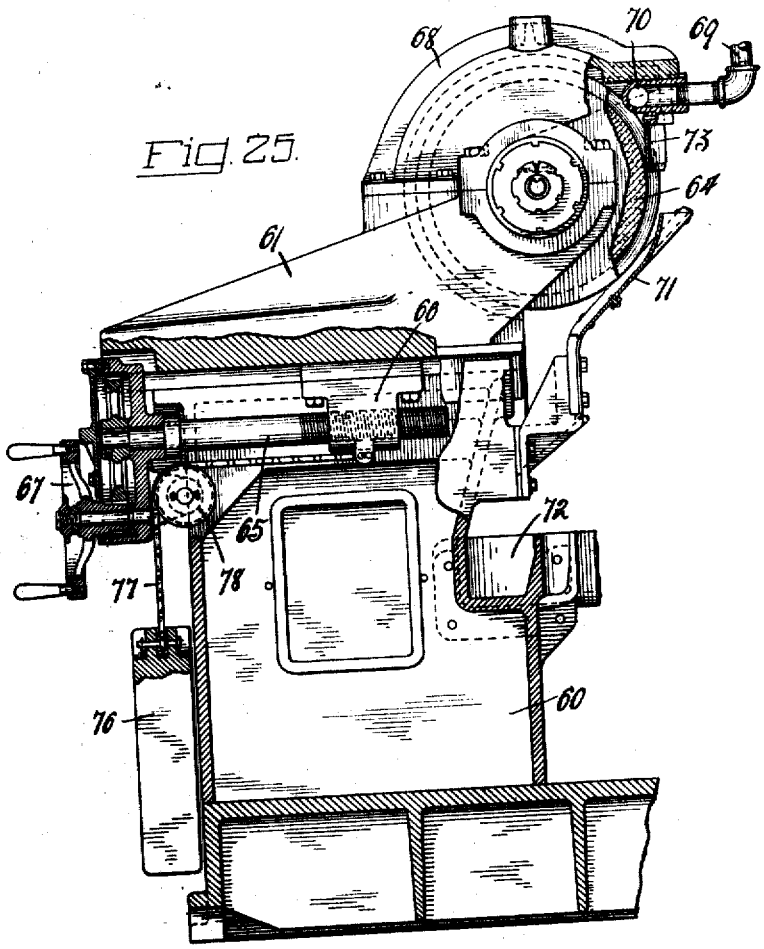
Figure 26:
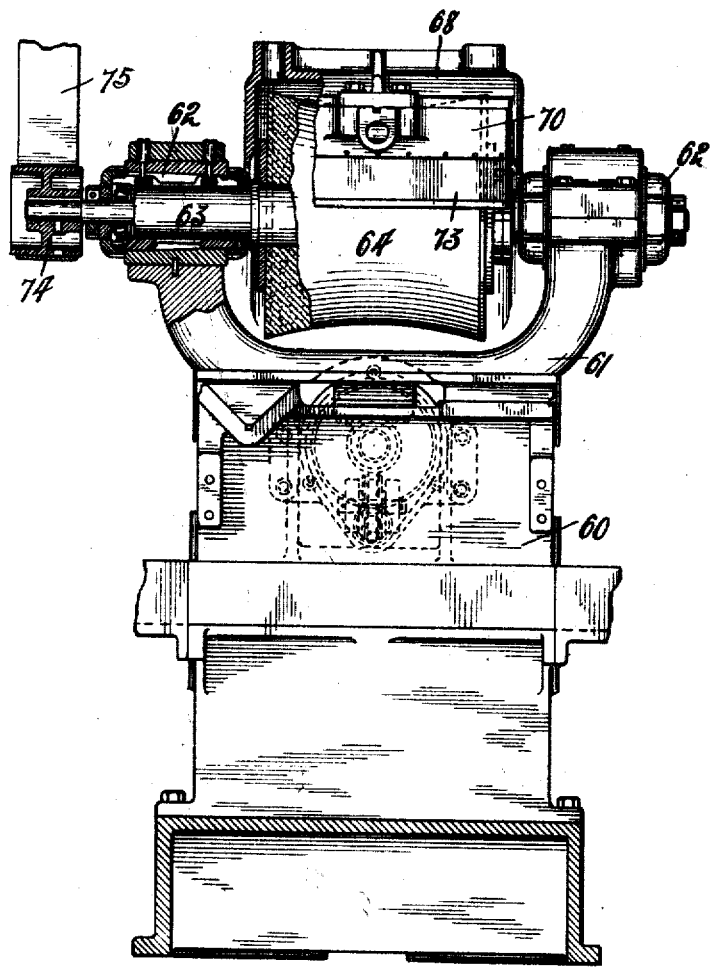

Figure 1 is a top plan view of a machine embodying the invention with one motor or article holder in article discharging position and one motor in article receiving position. Fig. 2 is a side elevation thereof with parts in section. Fig. 3 is an enlarged top plan view of the machine with a portion broken away and with the article delivery magazine removed. Fig. 3ª is a fragmentary view of the table 9 arm locking means in releasing position. Fig. 4 is an enlarged section on the line 4—4 in Fig. 2, with parts removed. Fig. 5 is an enlarged fragmentary section similar to a portion of the section in Fig. 2. Fig. 6 is a section on the line 6—6 in Fig. 5. Fig. 7 is an enlarged fragmentary perspective view of the electric current conducting rings and carrying means. Fig. 8 is a detail of the brush employed in connection with each conductor ring. Fig. 9 is an enlarged section on the line 9—9 in Fig. 2. Fig. 10 is an enlarged elevation of the left end of the machine with parts broken away and removed. Fig. 11 is an enlarged section on the line 11—11 in Fig. 2. Fig. 12 is an enlarged side elevation of the variable speed drive means with parts broken away. Fig. 13 is a top plan view of a portion of the article introducing means. Fig. 14 is a side elevation of said means in introducing register with an article holder with parts in section on the line 14—14 in Fig. 15. Fig. 15 is an outer end elevation of the article introducing means. Fig. 16 is a top plan view of the article feed hopper, magazine and operating means, with parts broken away. Fig. 17 is a section on the line 17—17 in Fig. 16. Fig. 18 is a side elevation of the article feed hopper, magazine and operating means, with parts in section on the line 18—18 in Fig. 16, and with a hopper slide in elevated position. Fig. 19 is a fragmentary sectional view thereof with the slide lowered. Fig. 20 is an enlarged perspective view of the hopper slide with a part broken away. Fig. 21 is a fragmentary view partly in section of the magazine and of the article release means in association therewith. Fig. 22 is a central vertical section of one of the article holding motors with parts in full. Fig. 23 is an outer end elevation thereof with a part in section on the line 23—23 in Fig. 22. Fig. 24 is a section on the line 24—24 in Fig. 23. Fig. 25 is an enlarged side elevation of one of the grinding or abrading members, its adjusting means and supporting frame with parts broken away. Fig. 26 is a front elevation of the same with parts broken away. Fig. 27 is a plan of the motor swinging cam, and Fig. 28 is a diagram of the cycle of operations with respect to one motor.

Referring to the drawings, 1 designates the machine base which is of circular form, in the present instance, and has arms or extensions 2, 3, 4 and 5, radially projecting therefrom in circumferentially spaced relation. A bearing pedestal 6 rises centrally from the base 1 and has a shaft 7 projecting upward from its upper end in coaxial relation therewith.

A turn table 8 is journaled on the pedestal 6 and has its lower hub end provided with a conical bearing surface, which rests in a conical hub flange 9 on the pedestal, and has its upper hub end provided with a conical hub bearing flange 10 for receiving a conical bearing 11 that is keyed to the shaft 7. The table 8 has a plurality of vertical bearing openings 12 therethrough, said openings, in the present instance, being ten in number and arranged in circular series concentric to the table axis and equidistantly spaced one from another. Radially mounted in each opening 12 (Figs. 2, 5 and 6) is a bushing 13 the bore of which is eccentric to the opening axis and conically enlarged at its upper end, as shown at 14. A shaft 15 is journaled in the bushing 13, extending entirely therethrough, and has its upper end provided with a conical enlargement for fitting the conical portion 14 of the bushing. The shaft 15 is retained seated in the bushing 13 by a collar 16 which is removably fixed to the shaft without the lower end of the bushing for end thrust engagement therewith. The upper end of the shaft 15 has an arm 17 projecting upward and laterally therefrom and carrying an electric motor 18 on its upper offset end. The motor lead wires, which are incased in a flexible loom or conduit 19, extend down through a central passage 20 in the shaft 15 and are connected to separate current distributing rings 21, three of which are provided, in the present instance. The rings 21 are concentric to the table axis and insulatingly carried by bracket arms 22, which are insulatingly secured to the under side of the table 8 adjacent to the cup flange 9. Current is fed to the rings 21 by brushes 23, one of which is provided for each ring. These brushes, a detail of one form of which is illustrated in Fig. 8, are insulatingly carried by the base 1 and each has a circuit wire 24 connected thereto. As the construction of these brushes forms no part of the present invention, a detailed description of the same will not be given.

The conduit 19 is held in concentric relation to the shaft 15 at its lower end thereof by an arm 25, which projects from the under side of the table. It will be understood that a transverse adjustment of the shaft 15 with respect to the table is effected by a turning of the eccentric bushing 13 within the table opening. For the purpose of locking the bushing in adjusted position within the table opening, such opening is extended above the table by a split flange 26 which is contracted by the tightening of a bolt 27 to grip and firmly hold the bushing (Figs. 5 and 6).

The motor 18 (Figs. 22, 23) has its armature shaft 28 disposed in the radial plane of projection of the arm 17 from the shaft 15 lengthwise thereof and has one end terminating over the axial center of the shaft 15 and provided with a collet 29 for receiving and holding an article $a$ to be operated on, with an end of such article projecting from the collet in position to be ground, abraded or polished in convex form. The article $a$, for the end grinding and polishing of which the present machine is particularly designed, comprises a tapered bearing roller having a tapered body portion which fits into the collet, and having an enlarged head at the large end of the tapered body, which head when finished is convex in form with its center axis disposed at some point on the longitudinal axis of the roller and coincident with the axis of the shaft 15 when carried by the collet 29. It will be understood that while the shaft 28 comprises the armature shaft of an electric motor, it may comprise an arbor which is driven in any other suitable manner.

The motor 18 has dove-tail connection with the upper end of the swinging arm 17 to adapt it for sliding axial adjustment relative to said arm. To effect such adjustment, in the present instance, a stud 30 projects downward from the bottom of the motor frame within a registering recess 31 in the top of the swinging arm, and opposite sides of this stud, which are transverse to the line of adjustment of the motor, are tapered or inclined in parallel relation with respect to a line drawn crosswise of the line of adjustment of the motor at right angles thereto. (Figs. 22, 23 and 24). Wedge bolts 32 have wedge surfaces in engagement with the respective tapered sides of the stud 30 and project outward through opposite side walls of the recess 31, carrying adjusting nuts 33 at their outer ends. It is evident that a loosening of one of these bolts and a tightening of the other will effect a shifting of the motor frame in one direction or the other longitudinally of its axis.

An arm 34 (Fig. 2) projects transversely from the lower end of each motor swinging shaft 15 and has a downwardly projecting wrist-pin carrying a roller 35, which travels in an endless cam-way 36 on the top of the frame base 1 and coöperates therewith to impart predetermined rocking movements to the shaft 15 as the table 8 is rotated. A coiled contractile spring 37 connects each arm 34 to an adjacent anchoring post 38 on the table 8 and exerts an outward pull on the arm 34 to normally bear outward against the outer wall of the cam-way 36.

A frame standard 39 rises from the arm or extension 2 of the base frame and is provided at its inner side with suitable upper and lower bearings 40 in which a vertical shaft 41 is journaled. (Figs. 2, 9, 11 and 12.) This shaft is provided adjacent to its lower end with a pinion 42, which is in driving mesh with an annular gear 43 on the table 8 to impart rotation to said table from the shaft 41. A worm gear 44 is keyed to the lower end of the shaft 41 in mesh with a drive worm 45 on a shaft 46, which is journaled in the lower bearing 40. A main drive shaft 47 which, in the present instance, carries a drive pulley 48 and is journaled in suitable bearings in axial relation to the shaft 46, is adapted to have direct driving connection with the shaft 46 through an interposed clutch 49, which may be of any suitable construction, and has indirect slow speed connection with the shaft 46 through a train of gears 50, 51, 52 and 53. The gears 51 and 52 are fixed to a common sleeve 54, which is mounted on an eccentric shaft 55 that is journaled in bearings 56 on the frame standard 39. The shaft 55 is made eccentric so that a turning of the same will throw the gears 51 and 52 out of mesh with their companions when it is desired to drive the shaft 46 direct from the shaft 47. The rocking of the eccentric shaft 55 is controlled by a handle 57 on one end thereof. The shifting of the clutch 49 is controlled by a lever 58.

A frame standard 60 rises from each base frame arm or extension 3, 4 and 5 in radially spaced relation to the table 8 and has a head 61 mounted on its top for horizontal sliding adjustment in radial relation to the table. (Figs. 1, 2, 25 and 26.) Each head 61 has its inner end forked and provided in the ends of its fork arms with bearings 62 in which the ends of a shaft 63 are journaled. A wheel 64 for acting on the work is mounted on the shaft 63 between the fork arms and may be of a nature to effect a trimming, grinding, abrading or polishing of the work, as desired, and for convenience will be hereinafter referred to as a grinding wheel element, or member. The periphery or working face of each wheel 64 is transversely dished or inwardly curved in an arc struck from the turning axis of the table 8 as is apparent by reference to Fig. 1. The axes of the wheels 64 are disposed in a horizontal plane with the axes of the article holding motors 18, and are adjustable toward and away from the motors by means of a screw shaft 65, which is journaled in the top portion of the respective frame standard 60 and threads through a nut member 66 on the bottom of the frame head 61. Each shaft 65, in the present instance, has its outer end geared to a hand wheel 67 (Fig. 25). The grinding wheel 64 is inclosed, except at its working side, by a housing 68. A fluid, to facilitate grinding, is delivered to the working face of the wheel through a pipe 69 and distributing box 70, which latter is perforated at its inner side to discharge fluid onto the wheel, and a deflector plate 71, at the lower inner side of the wheel directs fluid inward to a frame trough 72 as it falls thereon from the wheel. 73 designates a guard plate which projects down in advance of the wheel from the distributing box 70. Each wheel shaft carries a pulley 74 at one end which is connected by a belt 75 to any suitable source of power. Each frame head 61 is normally urged to move outward by the gravity action of a weight 76, which has a chain 77 passing over the sheave 78 and connected to the nut member 66.

In the present machine three grinding wheels 64 of different grades of coarseness are provided, and a work piece a, as it orbitally moves around the axis of a table 8 with a motor 18 by which carried in a revolution of a motor 18 with the table 8, first engages the rough grinding wheel, then the medium grinding wheel and then the polishing wheel. Each work-piece carried by a motor collet 29 is caused, as it moves past each grinding wheel, to have a horizontal swinging movement to give the head end of the work-piece the desired convex shape, the swinging axis of the work-piece, which is the axis of the motor carrying shaft 15, being the axis of cross curvature of the work-piece head. This swinging movement of the motor and work-piece for each grinding wheel is imparted to the motor carrying shaft 15 from the cam-way 36, as hereinafter more specifically described with reference to each wheel.

The mechanism employed for successively discharging a ground work-piece from each holder and introducing an unground work-piece therein at different predetermined points in a revolution of each holder will now be described.

The upper end of the shaft 41 carries two cam wheels, the lower being designated 80 and having upper and lower endless cam-ways b and c, respectively, and the upper being designated 81 and having upper and lower endless cam-ways d and e, respectively. The cam-way b on the wheel 80 receives a roller 82 that is carried by the arm 83 of a bell crank lever, which is pivoted at 84 on a bracket 85 projecting from one side of the frame standard 39. The other arm 86 of said lever is connected by a link 87 to a swinging arm 88, which is pivoted at its inner end on and swings horizontally about the upper end portion of the table shaft 7. With a ten unit machine, as at present illustrated, the cam-shaft 41 makes one revolution for each 36°, or one-tenth of a revolution, of the table 8, and the cam-way *b*, in the present instance, is developed to swing the arm 88 forward for substantially 22° at the same speed of movement as the table, then to return the arm to original position during substantially the next 7° of table movement, and then permitting the arm to remain at rest during substantially the next 7° of table movement, or for the remainder of the revolution of the cam.

During the forward swinging movement of the arm 88 it is locked to the table 8 and caused to have a positive movement therewith through the action of the locking cam *d* of the cam-wheel 81 on an associated mechanism. This mechanism comprises a lever 89, which is pivoted at 90 to the frame 39 and has a cam roller at one end traveling in the cam-way *d*. The other end of the lever 89 is yieldingly connected by a connecting rod 91 to a rocker-arm 92. The shaft 93, which carries this arm is journaled vertically in the swinging arm 88 a short distance from its inner end and carries an arm 94 below the swinging arm 88. The arm 94 has a wrist-pin projecting downward from its free end and carrying an indexing roller 95 within an indexing ring 96, which is mounted on the upper hub end of the table 8 in concentric relation to its axis and provided in its edge with a series of equidistantly spaced notches 97, corresponding in number to the motors 18 and with which notches the indexing roller 95 successively engages, as the table revolves, to lock the table and swinging arm together during each forward swinging movement of the latter.

The cam-way *d* is provided with connected inner and outer portions and when the roller which travels in said cam-way is in the inner neutral portion thereof the indexing arm 94 is at the limit of its inward movement in completely released relation to the indexing ring 96, as shown in Fig. 3ª, and when the cam engaging roller is traveling in the outer neutral portion of said cam-way the indexing arm 94 is at the limit of its outward swinging movement in locking relation to the indexing ring 96. The cam-way *d* is so fashioned and timed with respect to the swinging movements of the arm 88 that the indexing arm 94 has started its outward swinging or ring engaging movement from the position shown in Fig. 3ª slightly before the forward swinging movement of the arm 88 commences, as indicated by the diagram in Fig. 28. When the indexing roller 95 has been swung outward into adjacent relation to the indexing ring 96 the swinging arm 88 begins its swinging movement with the table and the indexing roller then enters a registering recess 97 in said ring and effects a rigid locking together of the table and swinging arm. The indexing roller is swung inward to release the indexing ring 96 just prior to the completion of the forward swinging stroke of the arm 88 so that such arm is completely disengaged from the table and free to swing backward by the time its forward stroke is completed. The connection 91 between the cam engaging lever 89 and rocker-arm 92 is longitudinally compressible against the tension of a spring 98 to allow for the relative movement of the lever 89 and arm 92 during the swinging movements of the arm 88, as is apparent.

The swinging arm 88 is provided at one side of its inner end with a horizontally projecting bracket 99 forming a guide-way for the reciprocatory movements of a cross-head 100 from which an article ejecting ram 101 projects longitudinally of the plane of reciprocatory movements of said block and toward the side of the machine at which the cam-wheels 80 and 81 are disposed (Figs. 2, 3 and 4). This ram is disposed in tangential relation to a circle struck from the table axis and lies in the horizontal plane of the motor-shafts 28 in position to have movements through said shafts from the rear end thereof, which shafts are hollow for such purpose, when each is at a predetermined point in its revolution with the table, and to strike the inner end of a finished work piece *a* carried by the collet end of such shaft and eject it from the collet, then returning to inactive position at the rear of the motor. During the period of entry of the ram 101 into and its withdrawal from the motor-shaft such shaft is held in alinement with the ram by reason of the form of the portion of the motor swinging cam-way 36, through which the cam engaging roller 35 is then traveling. The reciprocatory movements of the ram 101 are timed to take place during the forward swinging movement of the arm 88 and are controlled from the cam-way *e* in the cam-wheel 80 through the medium of a bell-crank lever 102, one arm of which is provided with a roller 103 (Figs. 2 and 4) while the other arm is connected by a rod 104 to the cross-head 100. The cam-way *e* is so fashioned and timed with respect to the movement of the swinging arm 88 that the discharging rod has no reciprocatory movement during approximately the first 2 degrees of forward movement of the swinging arm, the knock-out or ejecting stroke then taking place during approximately the next 9 degrees of movement of the swinging arm, and the withdrawal of the ram taking place during approximately the next 11 degrees of movement of the swinging arm, as indicated by the diagram in Fig. 28.

The swinging arm 88 is provided at its outer end with a longitudinally extending cross-head guide 105 in which is mounted a cross-head 106 for reciprocatory movements toward and away from the center of the table. This cross-head is connected by a rod 107 to one arm of a bell-crank lever 108, which is pivoted to the swinging arm 88, as at 109, and has its other arm connected by a rod 110 (Fig. 3) to one arm of a bell-crank lever 111, the other arm of which is provided with a roller which travels within the cam-way e in the under side of the cam-wheel 81. The lever 111 is pivoted, at 112, to an arm 113 projecting from the inner side of the frame standard 39. The cross-head 106 has an arm 114 projecting downward and transversely from its under side and carrying an article inserting rod or ram 115, which projects inwardly toward the center of the table 8 in true radial relation to its axis. During each forward swinging movement of the arm 88 the motor 18, from the collet of which a finished article has last been ejected, stands with its axis in true radial relation to the table axis, due to the form of the cam-way 36 in which the roller 35 associated with such motor is then traveling, and also with its axis in axial register with the inserting ram 115 so that upon an inward movement of said ram during such forward swinging movement of the arm 88 an article, placed in advance of the ram 115 as hereinafter described, is forced into holding position in the motor collet. The inserting and retracting movements of the ram 115 relative to the swinging movements of the arm 88 are timed approximately as diagrammatically illustrated in Fig. 28. The inserting ram 115 is yieldingly mounted for limited longitudinal reciprocatory movements in the arm 114 and is normally held inwardly projected by the action thereon of a coiled compression spring 116, thus adapting the ram to have a yielding article inserting action.

The work pieces are successively delivered in properly timed order, as hereinafter described, into a receiver 117 in position to be discharged therefrom into a registering motor collet at each forward stroke of the inserting ram 115 (Fig. 14). This receiver is carried for limited horizontal reciprocatory movements toward and away from the table axis by the swinging arm 88 and has a main longitudinally extending passage 118 therethrough in true radial relation to the table axis and through which the ram 115 operates, and has an article introducing opening 119 in the top side of its rear end portion in communication with the passage 118. A bar 120 fixedly projects rearward from the outer end of the receiver 117 and has its outer end frictionally engaged to the lower end of the arm 114 whereby a movement of said arm in one direction or the other will tend to impart movement in the same direction to the receiver. The bar 120, in the present instance, is engaged between a pair of relatively yielding plates 121, which are carried at the under side of the arm 114 and yieldingly urged to frictionally grip said bar by the action of coiled compression springs 122 mounted on bolts 123 connecting said plates and attaching them to said carrying arm.

It is evident that when the inserting ram 115 is at the limit of its rearward movement the receiver 117 is at the limit of its rearward movement with its forward end in spaced relation to a registering motor collet 29; that upon a forward movement of the inserting ram the receiver 117 is moved forward therewith for the limit of its forward movement and to place its forward end in substantially abutting relation to the registering collet, the ram then moving forward relative to the receiver due to the bar 120 sliding between the frictional gripping plates 121; and moving a work-piece from the receiver in holding position in the collet, and that upon a rearward movement of the inserting ram the receiver 117 is first retracted therewith to the position shown in Fig. 14 after which the ram moves rearward relative to the receiver to the limit of its stroke.

The articles a to be acted on are preferably carried in quantity in a hopper 124, which is mounted on and rises from the frame part 85 and has an inclined delivery way 125 (Figs. 16, 17, 18, 19 and 21) forming a magazine leading downward and forward therefrom and having a delivery tube 126 extending on an incline from its forward end into position to register at its lower discharge end with the receiving opening 119 in the receiver 117 when said receiver is in its retracted position, as shown in Fig. 14, and the swinging arm 88 carrying the same is at the limit of its rearward movement. The articles a travel down the magazine 125 in vertical position, being slidingly suspended therein by engagement of their enlarged head ends with side shoulders in the magazine run-way. The movement of the articles down the magazine run-way and the successive periodical releasing of the forward article in the column is controlled by a pair of pins 127 and 128 (Fig. 21), which transversely enter the magazine in spaced relation longitudinally thereof and are moved to alternately obstruct the magazine run-way. These pins enter the magazine at opposite sides thereof and are carried by respective arms 129 and 130, which project from a common rod 131 that is mounted for horizontal sliding movements transverse to the magazine 125 through a bracket 132, which rises from the frame part 85 and supports the forward end of the magazine. Each pin 127 and 128 is carried for yielding longitudinal movement by its arm, being normally projected inward therefrom toward the magazine by a coiled compression spring 133. Such spring pressed movement of each pin is limited by the coaction of a stop-shoulder on the outer end of the pin with the carrying arm. It is evident that a movement of the rod 131 in one direction will retract one article engaging pin and leave the other pin stationary in article obstructing position, while a movement of the rod in the opposite direction will cause a reverse action, thus first separating the lowermost article $a$ in the magazine from the other articles by the pin 128 and then dropping such separated article by retracting the pin 127 from obstructing position.

The rod 131 has its outer end connected to one arm of a lever 134, which is vertically disposed and pivoted to the frame part 85, as at 135 (Fig. 17), and the other arm of said lever is connected to a slide bar 136, which carries a roller 137 in engagement with an endless cam groove in one side of a cam wheel 138 that is fixed to the shaft 41. The cam 138 and associated article dropping mechanism are timed to release an article in the magazine and permit its discharge into the receiver 117 when the swinging arm 88 is at rest at the limit of its rearward movement. An article $a$ when released from the magazine passes, small end first, down through the tube 126 so that it is delivered to the receiver 117 in position for its small end to be forced into a registering motor collet by the inserting movement of the ram 115. In order to prevent an article $a$ from passing entirely through the receiver 117 when discharged therein, a guard plate 139 (Figs. 13, 14) is provided in position to obstruct the outlet end of the receiver passage when the arm 88 is at the limit of its rearward swinging movement. This plate fixedly projects from the inner side of the frame part 85. It will be understood that the receiver 117 and registering motor collet 29 will have moved out of register with the guard plate 139 by the time the inserting ram 115 is moved forward to discharge an article from the receiver and into the motor collet.

A slide 140 operates vertically in the hopper 124 to successively elevate articles within the hopper and deliver them to the magazine 125. This slide has its upper end inclined and formed to pick up a plurality of articles $a$ at each elevating movement and to permit them to slide by gravity down into the registering magazine passage. A trip finger 141 is pivotally carried by the slide 140 at the forward end of its article elevating portion and acts to prevent the articles carried by the slide from moving therefrom into the magazine until such finger has been tripped for such purpose. The tripping of the finger is effected by contact of a part thereof with a screw 142 that is carried by the hopper in position to engage and trip the finger when the slide is in register with the magazine.

The slide 140 carries a roller 143 at its lower end below the slide cutting portion of the hopper and this roller rests on the periphery of a cam wheel 144 that is mounted on a horizontal shaft 145 (Fig. 17) journaled in bearing arms 146 which project down from the bottom of the frame part 85. The shaft 145 carries a gear-wheel 147 in mesh with a drive pinion 148 on a shaft 150 which is journaled in a bearing arm 151 projecting down from the frame part 85. The shaft 150 has a pulley 152, which is connected by a belt 153 to a pulley 154 on the shaft 41. The fork 155, which is fixed to the lower end of the slide 140 and carries the roller 143, has a catch lever 156 pivoted in vertical position to one side thereof and provided at its upper end with a catch nose 157 and at its lower end with a horizontally disposed roller 158 which rides against the side of a transversely broadened edge portion 159 on the cam-wheel 144 when such cam-wheel is in engagement with the roller 143, it being understood that said wheel and roller are in engagement only during a portion of a revolution of the cam. Should the slide 140 for any reason not follow the cam 144 down but remain suspended in elevated position, the lever 156 will be swung by spring action (not shown) into position for its catch nose 157 to engage a stop lug 160 and prevent the slide from falling until the cam has been turned into position to engage the roller 143 and move the lever 156 to release the lug 160.

The cam-way 36, which is developed to control the swinging movements of the several motors 18 as they revolve with the table 8, has the neutral portion $h$, in which the roller 35 of each motor travels during the article receiving period thereof, such neutral portion maintaining the motor axis in true radial relation to the table axis and continuing until the motor has moved into position for the center of the article head carried thereby to have contact with the first or rough grinding wheel or member 64. The roller 35 then passes outward through a cam portion $i$ to an outer neutral portion $j$, and in its passage through such cam portion causes a swinging of the motor about the axis of the shaft 15, which axis is coincident with the axis of cross-curvature of the article head, thus effecting an orbital swinging of such head in one direction to gradually shift the point of contact thereof with the grinding member from the center to one side edge of the head, as is apparent by reference to Fig. 1. The motor then remains in shifted position during the passage of the roller 35 through the portion $j$ of the cam-way and until an edge of the article head has moved into contact with the medium or next grinding member in order, when the roller 35 passes inward through the cam portion $k$ of the way and effects a return of the article carrying shaft or part of the motor to radial relation to the table shaft 7. The roller 35 then travels in the neutral portion $l$ of the way and maintains the motor in such position until the head of the article carried thereby has moved into contact with the finishing or next grinding or polishing member in order, when the roller passes outward and then inward through the cam portion $m$ of the way to the neutral portion $n$ thereof, thereby causing a swinging of the motor in one direction with its article head in contact with the grinding member and then returning the motor to article ejecting position. The ejecting of the ground article from the motor is effected while the roller 35 is traversing the neutral portion $n$ of the way, which maintains the motor shaft axis in register with the ejecting ram 101 and out of radial relation to the table shaft. The neutral portions $h$ and $n$ are connected by the short cam portion $o$ by means of which the motor is swung from article ejecting to article receiving position.

A diamond trimmer point 165 is carried by a standard 166 on the table 8 (Fig. 1) and is intended to have trimming engagement with the working face of each grinding-wheel 64 as it passes the same in a revolution with the table.

The operation of my machine is as follows:—While in reality the introducing into the collet of each motor of an article to be acted on takes place at the beginning of a cycle of operations for such motor, and the discharging of the finished article therefrom takes place at the end of a cycle of operations, it will be more convenient and the description of the operation will be simplified to consider these two acts together, inasmuch as the discharging of a finished article from one motor and the introducing of an article into the next succeeding motor takes place approximately at the same time and are accomplished during each forward swinging movement of the arm 88 with the table 8. During each forward swinging movement of the arm 88 the roller 35 of a motor from which an article is to be discharged is traversing the neutral portion $n$ of the cam-way 36 with the motor shaft in register with the ejecting ram 101, and the roller 35 of the preceding motor is traversing the neutral portion $h$ of said cam-way with the motor shaft in receiving register with the receiver 117 and inserting ram 115. The swinging movements of the arm 88 are controlled by the cam-way $b$ in the cam-wheel 80, the lever 83—86 and links 87, said cam-wheel making a complete revolution for each 36° of movement of the table 8, if ten motors 18 are employed, as in the present instance. At the beginning of the forward swinging movement of the arm 88, it is locked to the table by the engagement of an indexing roller 95 with one of a series of notches 97 in an indexing ring 96 on the table. The periodical locking and releasing movements of the indexing roller 95 are controlled from the cam-way $d$ in the wheel 81 through the medium of a lever 89, yielding connection 91, and lever 92, 93, 94. When the hollow shaft 28 of a motor has moved into register with the ejecting-ram 101, the cam-way $c$ in the wheel 80 effects a rocking of the lever 102 to advance the ejecting ram through the shaft and cause it to knock the ground article from the collet at the outer end and then to withdraw the ram from the motor. During the ejecting of an article from one motor an article to be ground is being introduced into the next preceding motor from the receiver 117 by the inserting ram 115. As the arm 88 swings forward the cross-head 106, which carries the ram 115, is first advanced to transfer an article from the receiver 117 into holding position in the registering motor collet and is then retracted. The initial inward and outward movements of the ram 115 cause the receiver 117 to respectively move into and out of abutting contact with the registering collet, due to the frictional sliding connection between the ram and receiver. The reciprocatory movements of the cross head 106 carrying the inserting ram are controlled from the under cam-way $e$ in the wheel 81 through the medium of the lever 111, rod 110, lever 108 and rod 107. When the arm 88 is at rest at the rear end of its stroke the cam wheel 138 and connecting means moves the bar 131 to the right (Figs. 16 and 17) to retract the dropping pin 127 and release the lowermost article $a$ in the magazine 125 and permit it to pass down through the tube 126 and into the receiver 117, which then registers therewith, through the opening 119 in its top. After the article $a$ has been dropped from the magazine the bar 131 is moved to the left to permit a return of the pin 127 to obstructing position in the magazine and to retract the pin 128 from stop position therein. The magazine 135 is continually replenished with work pieces by the periodical raising of the slide 140 within the hopper 124, which is automatically effected by the turning of the cam-wheel 144 in peripheral contact with the slide roller 143. A motor, after having an article $a$ inserted in its collet, continues its revolution with the table 8 and places the exposed head end of the article carried thereby into grinding contact with the successive grinding-wheels 64 disposed around the course of movement thereof, each article having a swinging movement relative to the table 8 imparted thereto as it moves by each grinding wheel in contact therewith, thereby causing an arcuate grinding of the article end. A turning of a hand wheel 67 effects an adjustment of the associated grinding wheel 64 toward the center of the table to compensate for wear. It will be understood that a stopping and starting of the machine is effected by a shifting of the clutch lever 58, and if the machine is in slow speed gear the running of the machine can be stopped or started by a shifting of the control handle 57. As the table 8 revolves the current for each motor 18 is taken from a pair of conductor rings 21 with each of which a supply brush 23 has contact.

It is evident that my machine may be provided with any desired number of motors 18, or work holding and rotating units, and with any number of grinding, polishing or abrading elements, and that the cam-way 36 should be developed to suit the number of such elements employed, and the different cam wheels for controlling the article dropping, inserting and ejecting mechanisms geared to make as many revolutions to one revolution of the table 8 as there are work holding units, providing, of course, such cam-wheels have only one mechanism operating portion, as in the present case. If the machine is provided with ten units, as in the present instance, the cam-ways of the different cam-wheels would be of too great a length if provided with ten successive operating portions, and it is for this reason that the cam-wheels are provided with individual cam-ways and geared to rotate ten times as rapidly as the table.

I wish it understood that the particular machine and the different parts thereof illustrated and described are merely a typical embodiment of one form of my invention, and that the specific form embodied herein is merely by way of illustration and not by way of limitation or narrowing of my claims, as obviously, a great many changes in construction and design can be made without departing from my invention, and, obviously, also, various of the features described can be omitted leaving the machine still operative to usefully do certain of the work described, and such changes are contemplated by me and would not involve any departure from my invention.

Having thus described my invention what I claim as new and desire to secure by Letters Patent is—

1. In a machine of the class described, a horizontally rotatable member, a vertically disposed shaft carried by said member at one side of its axis, means carried by the upper end of said shaft in offset relation to its axis and having a reclining rotating article holding part, and means for imparting predetermined swinging movements to said shaft when revolving with said member.

2. In a machine of the class described, a horizontally rotatable member, a vertically disposed shaft carried by said member at one side of its axis, an electric motor carried by the upper end of said shaft for rocking movements therewith and having its rotor axis angled with respect to said shaft and adapted to hold an article for rotation therewith, and means for imparting predetermined swinging movements to said shaft when revolving with said member.

3. In a machine of the class described, an electric motor mounted for horizontal swinging movements and having its rotor-shaft provided at one end with an article holding collet positioned for an article carried thereby to be intersected by the swinging axis of the motor.

4. In a machine of the class described, an electric motor mounted for swinging movements and having its rotor shaft angled with respect to its swinging axis and provided with article holding means at one end, which means is intersected by the swinging axis of the motor, said rotor shaft being hollow for the insertion of an article ejecting member therethrough.

5. In a machine of the class described, a vertically disposed shaft, an electric motor carried in offset relation by an end of said shaft and having its rotor shaft hollow for the insertion of article ejecting means at one end thereof and disposed at an angle to said shaft axis, and article holding means carried by an end of said shaft and disposed in line with the axis of said first shaft.

6. In a machine of the class described, a vertically disposed shaft having an offset motor carrying arm at one end, an electric motor adjustably mounted on said arm with its rotor axis at an angle to said shaft axis, means for adjusting said motor on said arm, and means carried by the rotor shaft for holding an article in line with the axis of said first shaft.

7. In a machine of the class described, an electric motor mounted for revoluble movements about one axis and swinging movements about a different axis, means carried by one end of the rotor shaft of said motor to hold an article with an end thereof exposed, grinding means with which the exposed end of an article carried by said first means is adapted to have contact at a predetermined point in a revolution of said motor, means for imparting predetermined swinging movements to the motor when the article carried thereby is in engagement with said grinding means, and means operable to eject an article from the rotor shaft when the motor is at a predetermined point in a revoluble movement thereof.

8. In a machine of the class described, a horizontally rotatable member, a vertically disposed shaft carried by said member at one side of its axis, means carried by the upper end of said shaft in offset relation to its axis and having a reclining rotating article holding part, an endless stationary cam-way below said member, and an arm projecting from the lower end of said shaft and having a part traveling in said cam-way and coacting therewith to impart predetermined swinging movements to the arm and shaft when said member is rotated.

9. In a machine of the class described, an electric motor mounted for revoluble and swinging movements about different substantially parallel axes and having an article holder driven thereby and rotating about an axis which is angularly disposed with relation to said swinging axis, a grinding element with which an article carried by said holder coacts at a predetermined point in a revolution of said motor, and means for imparting predetermined swinging movements to said motor when adjacent to said element.

10. In a machine of the class described, an electric motor mounted for revoluble and swinging movements about different substantially parallel axes and having an article holder driven thereby and which rotates about an axis angularly disposed to said swinging axis, a plurality of grinding elements with which an article carried by said holder coacts at different predetermined points in a revolution of said motor, and means for imparting different predetermined swinging movements to said motor when adjacent to successive of said elements.

11. In a machine of the class described, a horizontally rotatable member, an upright shaft carried by said member at one side of its axis, an electric motor carried by the upper end of said shaft and having a rotating article holding part, means for imparting predetermined rocking movements to said shaft when revolved about the member axis, a plurality of electric conductor rings carried by said member, electric brushes for supplying current to said rings, and electrical connection between said rings and motor.

12. In a machine of the class described, a movable article holder, and means operable to deliver an article to said holder at a predetermined point in its movement and to move therewith during such delivery.

13. In a machine of the class described, a movable member, a rotatable article holder carried thereby, means for imparting movements to said member, and means operable to periodically deliver an article to said holder during a predetermined portion of the movement of said member and to move therewith during such delivery.

14. In a machine of the class described, a revoluble article holder, and means operable to deliver an article to said holder during a predetermined portion of its movement and to move therewith during such delivery.

15. In a machine of the class described, revoluble means having a rotatable article holder, means for revolving said first means, and means operable to periodically deliver an article to said holder during a predetermined portion of its movement with said revoluble means and to move therewith during such delivery.

16. In a machine of the class described, a revoluble article holder, means having a part mounted for swinging movements concentric to the axis of movement of said holder and periodically operable to deliver articles to said holder when moving therewith.

17. In a machine of the class described, a revoluble article holder, means mounted for swinging movements about the axis of revolution of said holder and having an article carrying part, and mechanism operable to impart predetermined swinging movements to said means and to discharge an article therefrom into said holder at predetermined intervals.

18. In a machine of the class described, a movable article holder, means for imparting predetermined movements to said holder, a frame mounted for forward and backward movements with its movements in one direction uniform with the movements of said holder, and mechanism operable to impart movement to said frame and to deliver an article from a part thereof to said holder during predetermined portions of the movements of said frame and holder.

19. In a machine of the class described, an article holder mounted for revoluble movement, means for moving said holder about its axis of revolution, a movable frame, and mechanism operable to periodically cause said frame to have movements with said holder and to discharge an article from a part thereof into said holder.

20. In a machine of the class described, an article holder and an article receiver, both mounted for predetermined movements with one registering with the other during a portion of their respective movements, and mechanism operable to impart movement to said receiver and to discharge an article therefrom into said holder during the registering movement thereof.

21. In a machine of the class described, an article holder and an article receiver mounted for predetermined movements about a common axis and being in register during a portion of their respective movements, separate means for moving said holder and receiver and means operable to discharge an article from said receiver into said holder during predetermined portions of their registering movements.

22. In a machine of the class described, an article holder and an article receiver mounted for predetermined movements and adapted to register during a portion of their respective movements, and mechanism having separate means for imparting respective movements to said holder and receiver and for discharging an article from said receiver into said holder during predetermined portions of their registering movements.

23. In a machine of the class described, an article holder mounted for revoluble movements, an article receiver mounted for swinging movements concentric to the movements of said holder, and mechanism having separate means for imparting the respective revoluble and swinging movements to said holder and receiver and for discharging an article from the receiver into said holder during predetermined portions of their respective movements.

24. In a machine of the class described, a rotatable member, a rotatable article holder carried by said member for revoluble movements therewith, a frame mounted for swinging movements concentric to the member axis and having article carrying means, means for rotating said table, means for imparting swinging movements to said frame with the movement thereof in one direction uniform with that of said holder, and means for discharging an article from the carrying means of said frame into said holder during predetermined portions of the respective movements of said frame and holder.

25. In a machine of the class described, a movable article holder, means for imparting predetermined movements to said holder, a frame mounted for forward and backward movements with its movements in one direction uniform with the movements of said holder, mechanism operable to impart movement to said frame and to deliver an article from a part thereof to said holder during predetermined portions of the movements of said frame and holder, and means periodically operable to lock the article holder and frame together for predetermined movements in unison and then to release the same.

26. In a machine of the class described, an article holder mounted for revoluble movements, means for moving said holder about its axis of revolution, a movable frame, mechanism operable to periodically cause said frame to have movements with said holder and to discharge an article through a part thereof into said holder, and means periodically operable to lock the article holder and frame together for predetermined movements in unison and then to release the same.

27. In a machine of the class described, a rotatable member, a rotatable article holder carried by said member for revoluble movements therewith, a frame mounted for swinging movements concentric to the member axis and having article carrying means, means for rotating said table, means for imparting swinging movements to said frame with the movement thereof in one direction uniform with that of said holder, means for discharging an article from the carrying means of said frame into said holder during predetermined portions of the respective movements of said frame and holder, and means which is periodically operable to lock the article holder and frame together for predetermined movements in unison and then to release the same.

28. In a machine of the class described, an article holder and an article receiver both mounted for predetermined movements with one registering with the other during a portion of their respective movements, mechanism operable to impart movement to said receiver and to discharge an article therefrom into said holder during the registering movement thereof, and means periodically operable to lock the article holder and receiver together for movements in unison and then to release the same.

29. In a machine of the class described, an article holder and an article receiver mounted for predetermined movements and being in register during a portion of their respective movements, separate means for moving said holder and receiver, and means operable to discharge an article from said receiver into said holder during predetermined portions of their registering movements, and means periodically operable to lock the article holder and receiver together for movements in unison and then to release the same.

30. In a machine of the class described, an article holder and an article receiver mounted for predetermined movements and adapted to register during a portion of their respective movements, automatically operable mechanism having separate means for imparting respective movements to said holder and receiver and for discharging an article from said receiver into said holder during predetermined portions of their registering movements, and means periodically operable to lock the article holder and receiver together for movements in unison and then to release the same.

31. In a machine of the class described, an article holder mounted for revoluble movements, an article receiver mounted for swinging movements concentric to the movement of said holder, mechanism having separate means for imparting the respective revoluble and swinging movements to said holder and receiver and for discharging an article from the receiver into said holder during predetermined portions of their respective movements, and means periodically operable to lock the article holder and receiver together for movements in unison and then to release the same.

32. In a machine of the class described, an article holder mounted for revoluble and swinging movements about different axes, means having a part movable with said holder during predetermined portions of its revoluble movements and operable to deliver an article to said holder when moving therewith, means for revolving said holder, and means for imparting predetermined swinging movements thereto and retaining the holder in one position of its swinging movement when receiving an article.

33. In a machine of the class described, an article holder mounted for swinging movements, means for imparting predetermined transverse movements to the swinging axis of said holder, mechanism having a part periodically movable with said holder during the transverse movement of its axis, and operable to discharge an article from said part into said holder during such movement together, and means for imparting predetermined swinging movements to said holder when its axis is transversely moved and adapted to retain said holder in one position of its swinging movements when receiving an article from said mechanism.

34. In a machine of the class described, a revoluble article holder, an article receiver mounted for swinging movements concentric to the axis of movement of said holder, means for revolving said holder, means for imparting swinging movements to said receiver, means operable to lock said holder and receiver together during movements of said receiver in the direction of movement of said holder, and means for delivering an article from said receiver into said holder when moving together.

35. In a machine of the class described, an article holder mounted for revoluble movements, an arm mounted for swinging movements about the axis of revolution of said holder, an article receiver carried by said arm in position to register with said holder at a predetermined portion of its movement, means periodically operable to lock said holder and arm together to have predetermined movements in unison with said receiver in register with the holder, and means operable to impart backward and forward swinging movements to said arm and to deliver an article from said receiver to said holder when moving in unison.

36. In a machine of the class described, an article holder having a predetermined course of movement, means for moving said holder, an article receiver movable with said holder during a portion of its movement and also movable toward and away from said holder, and mechanism for imparting predetermined movements to said receiver and to move it into discharging relation to the holder and to discharge an article therefrom into the holder when moving therewith.

37. In a machine of the class described, a movable article holder, an article receiver movable both longitudinally and transversely of said holder, and means operable to move said receiver transversely of the holder into and out of longitudinal register therewith and to periodically move the receiver longitudinally of the holder and effect the discharge of an article from the receiver into the holder when in adjacent longitudinal relation thereto.

38. In a machine of the class described, a movable article holder, a receiver into which an article is introduced preparatory to being delivered to said holder, said receiver being movable both transversely and longitudinally of said holder, and mechanism operable to periodically place said receiver into longitudinal register with said holder and move one with the other and also operable to move said receiver into adjacent relation to said holder longitudinally thereof and to discharge an article from one to the other thereof.

39. In a machine of the class described, a revoluble article holder, an article receiver movable both longitudinally and transversely of said holder with its transverse movements concentric thereto, and means operable to move said receiver transversely of the holder into and out of longitudinal register therewith and to periodically move the receiver longitudinally of the holder and effect the discharge of an article from the receiver into the holder when in adjacent longitudinal relation thereto.

40. In a machine of the class described, a revoluble article holder, a receiver into which an article is introduced preparatory to being delivered to said holder, said receiver being movable both transversely and longitudinally of said holder with its transverse movements concentric thereto, and mechanism operable to periodically place said receiver into longitudinal register with said holder and move one with the other and also operable to move said receiver into adjacent relation to said holder longitudinally thereof and to discharge an article from one to the other thereof.

41. In a machine of the class described, a rotatable article holder having movements transverse to its axis of rotation, a movable article receiver, and mechanism operable to periodically move said receiver with said holder in register therewith and to discharge an article from the receiver into the holder during such movement.

42. In a machine of the class described, a rotatable article holder having movements transverse to its axis of rotation, an article receiver mounted for reciprocatory movements longitudinally of the movement of said holder with a forward stroke thereof periodically registering with said holder and uniform with its movement, means for reciprocating said receiver, and means for discharging an article from said receiver into said holder when in register one with the other.

43. In a machine of the class described, a rotatable holder having movements transverse to its axis of rotation, an article receiver mounted for reciprocatory movements longitudinally of the movement of said holder with a forward stroke thereof periodically registering with said holder and uniform with its movement, said receiver also being movable transverse to its reciprocatory movements, and mechanism for imparting predetermined longitudinal and transverse reciprocatory movements to said receiver relative to the movement of said holder to periodically place the receiver in adjacent register with the holder and when in register to deliver an article from the receiver into the holder.

44. In a machine of the class described, a rotatable article holder having movements transverse to its axis of rotation, a frame mounted for reciprocatory movements longitudinally of said holder, an article receiver carried by said frame for movements toward and away from the path of movement of said holder, and mechanism for moving said frame to periodically place said receiver into register with said holder and then move it a predetermined extent therewith and to move the receiver in the frame adjacent to said holder and then deliver an article from the receiver into said holder.

45. In a machine of the class described, an article holder having movements transverse thereto, a frame mounted for reciprocatory movements longitudinally of the movement of said holder, an article receiver carried by said frame for limited movements toward and away from the path of movement of said holder, a ram carried by said frame for movements through said receiver, means connecting said receiver and ram for yieldingly moving one with the other toward and away from the path of movement of said holder, means for imparting predetermined movements to said frame to cause said receiver to periodically register with and have a predetermined movement with said holder, and means for operating said ram to discharge an article from the receiver into said holder when in register and then to return to retracted position.

46. In a machine of the class described, a rotatable article holder having orbital movements in one direction transverse to its axis of rotation, a frame mounted for reciprocatory movements concentric to the orbital movements of said holder, an article receiver carried by said frame for movements toward and away from the path of movement of said holder, and mechanism for moving said frame to periodically place said receiver into register with said holder and then move it a predetermined extent orbitally therewith and to move the receiver in the frame adjacent to said holder and the deliver an article from the receiver into the holder.

47. In a machine of the class described, an article holder having transverse orbital movements in one direction, a frame mounted for reciprocatory movements concentric to the orbital movements of said holder, an article receiver carried by said frame for limited movements toward and away from the path of movement of said holder, a ram carried by said frame for movements through said receiver, means connecting said receiver and ram for yieldingly moving one with the other toward and away from the path of movement of said holder, means for imparting predetermined movements to said frame to cause said receiver to periodically register with and have a predetermined movement with said holder, and means for operating said ram to discharge an article from the receiver into said holder when in register and then to return to retracted position.

48. In a machine of the class described, a rotatable member, an article holder carried for revoluble movements by said member, a frame mounted for swinging movements concentric to said member axis, means operable to periodically lock said member and frame together for unitary movements, means for periodically reciprocating said frame, and means having parts carried by said frame and operable to periodically deliver an article to said holder.

49. In a machine of the class described, a rotatable member, an article holder carried by said member for orbital movements about its axis, a frame mounted for oscillatory movements concentric to said member axis, means operable to periodically lock said frame and member together, means for imparting predetermined swinging movements to said frame, and means having parts carried by said frame and periodically operable to deliver articles into said holder, such delivery taking place when said frame and member are locked together, said locking, frame moving and article delivery means each being cam controlled.

50. In a machine of the class described, an article holder and an article receiver both mounted for predetermined movements with one registering with the other during a portion of their respective movements, mechanism operable to impart movement to said receiver and to discharge an article therefrom into said holder during the registering movement thereof, and means automatically operable to periodically deliver articles to the article receiver.

51. In a machine of the class described, an article holder and an article receiver mounted for predetermined movements and being in register during a portion of their respective movements, separate means for moving said holder and receiver, means operable to discharge an article from said receiver into said holder during predetermined portions of their registering movements, and means automatically operable to periodically deliver articles to the article receiver.

52. In a machine of the class described, an article holder and an article receiver mounted for predetermined movements and adapted to register during a portion of their respective movements, automatically operable mechanism having separate means for imparting respective movements to said holder and receiver and for discharging an article from said receiver into said holder during predetermined portions of their registering movements, and means automatically operable to periodically deliver articles to the article receiver.

53. In a machine of the class described, an article holder mounted for revoluble movements, an article receiver mounted for swinging movements concentric to the movement of said holder, mechanism having separate means for imparting the respective revoluble and swinging movements to said holder and receiver and for discharging an article from the receiver into said holder during predetermined portions of their respective movements, and means automatically operable to periodically deliver articles to the article receiver.

54. In a machine of the class described, a revoluble article holder, an article receiver mounted for swinging movements concentric to the axis of movement of said holder, means for revolving said holder, means for imparting swinging movements to said receiver, means operable to lock said holder and receiver together during movements of said receiver in the direction of movement of said holder, means for delivering an article from said receiver into said holder when moving together, and means automatically operable to periodically deliver articles to the article receiver.

55. In a machine of the class described, an article holder mounted for revoluble movements, an arm mounted for swinging movements about the axis of revolution of said holder, an article receiver carried by said arm in position to register with said holder during a predetermined portion of its movement, means periodically operable to lock said holder and arm together to have predetermined movements in unison with said receiver in register with the holder, means operable to impart backward and forward swinging movements to said arm and to deliver an article from said receiver to said holder when moving in unison, and means automatically operable to periodically deliver articles to the article receiver.

56. In a machine of the class described, an article holder having a predetermined course of movement, means for moving said holder, an article receiver movable with said holder during a portion of its movement and also movable toward and away from said holder, mechanism for imparting predetermined movements to said receiver and to move it into discharging relation to the holder and to discharge an article therefrom into the holder when moving therewith, and means automatically operable to periodically deliver articles to the article receiver.

57. In a machine of the class described, a movable article holder, an article receiver movable both longitudinally and transversely of said holder, means operable to move said receiver transversely of the holder into and out of longitudinal register therewith and to periodically move the receiver longitudinally of the holder and effect the discharge of an article from the receiver into the holder when in adjacent longitudinal relation thereto, and means automatically operable to periodically deliver articles to the article receiver.

58. In a machine of the class described, a movable article holder, a receiver into which an article is introduced preparatory to being delivered to said holder, said receiver being movable both transversely and longitudinally of said holder, mechanism operable to periodically place said receiver into longitudinal register with said holder and move one with the other and also operable to move said receiver into adjacent relation to said holder longitudinally thereof and to discharge an article from one to the other thereof, and means automatically operable to periodically deliver articles to the article receiver.

59. In a machine of the class described, a rotatable article holder having movements transverse to its axis of rotation, a movable article receiver, mechanism operable to periodically move said receiver with said holder in register therewith and to discharge an article from the receiver into the holder during such movement, and means automatically operable to periodically deliver articles to the article receiver.

60. In a machine of the class described, a rotatable article holder having movements transverse to its axis of rotation, an article receiver mounted for reciprocatory movements longitudinally of the movement of said holder with a forward stroke thereof periodically registering with said holder and uniform with its movement, means for reciprocating said receiver, means for discharging an article from the receiver into said holder when in register one with the other, and means automatically operable to periodically deliver articles to the article receiver.

61. In a machine of the class described, a rotatable holder having movements transverse to its axis of rotation, an article receiver mounted for reciprocatory movements longitudinally of the movement of said holder with the forward stroke thereof periodically registering with said holder and uniform with its movement, said receiver also being movable transverse to its reciprocatory movements, mechanism for imparting predetermined longitudinal and transverse reciprocatory movements to said receiver relative to the movement of said holder to periodically place the receiver in adjacent register with the holder and when in register to deliver an article from the receiver into the holder, and means automatically operable to periodically deliver articles to the article receiver.

62. In a machine of the class described, a rotatable article holder having movements transverse to its axis of rotation, a frame mounted for reciprocatory movements longitudinally of said holder, an article receiver carried by said frame for movements toward and away from the path of movement of said holder, mechanism for moving said frame to periodically place said receiver into register with said holder and then move it a predetermined extent therewith and to move the receiver in the frame adjacent to said holder and then deliver an article from the receiver into said holder, and means automatically operable to periodically deliver articles to the article receiver.

63. In a machine of the class described, an article holder having movements transverse thereto, a frame mounted for reciprocatory movement longitudinally of the movement of said holder, an article receiver carried by said frame for limited movements toward and away from the path of movement of said holder, a ram carried by said frame for movements through said receiver, means connecting said receiver and ram for yieldingly moving one with the other toward and away from the path of movement of said holder, means for imparting predetermined movements to said frame to cause said receiver to periodically register with and have a predetermined movement with said holder, means for operating said ram to discharge an article from the receiver into said holder when in register and then to return to retracted position, and means automatically operable to periodically deliver articles to the article receiver.

64. In a machine of the class described, an article holder, means for imparting predetermined movements to said holder, an article receiver mounted for reciprocatory movements, means for delivering an article to said receiver when in one position of its movement, and means for imparting predetermined reciprocatory movements to said receiver and periodically discharging an article therefrom into said holder.

65. In a machine of the class described, a revoluble moving article holder, oscillatory means operable to introduce an article into said holder at a predetermined point in a movement thereof, and means operable to periodically deliver articles to said first means.

66. In a machine of the class described, a revoluble moving electric motor having a rotating article holding part, means operable to periodically deliver articles to the holding part of said motor, and means automatically operable to periodically deliver articles to said first means.

67. In a machine of the class described, a revoluble moving article holder, a frame mounted for swinging movements concentric to the path of movement of the article holder, an article receiver carried by said frame and adapted to periodically register with said holder, means automatically operable to periodically deliver an article to said receiver when in one position of its movement with said frame, and means automatically operable to discharge an article from said receiver into said holder when the receiver and holder are in register.

68. In a machine of the class described, an article holder having predetermined movements, a frame mounted for reciprocatory movements parallel to the movements of said holder, an article receiver carried by said frame and having a discharge opening therethrough which periodically registers with said holder and having a transverse opening into said discharge opening, means automatically operable to deliver an article into the discharge opening of said receiver through the transverse opening thereof when the frame is in one position of its movement, means operable to impart predetermined reciprocatory movements to said frame, and means operable to discharge an article from said receiver into said holder when in register one with the other.

69. In a machine of the class described, a rotating member having an indexing notch concentric to its axis, an article holder carried by said member for revoluble movements about its axis, a frame mounted for swinging movements concentric to said member axis, means having parts carried by said frame for periodically delivering articles to said holder, means for imparting predetermined swinging movements to said frame, and means having a part carried by said frame and yieldingly operable to periodically engage within said indexing notch and lock said frame and member together.

70. In a machine of the class described, a rotating member having a revoluble article holding part, a frame mounted for reciprocatory movements concentric to the movements of said part, means for imparting predetermined swinging movements to said frame, means having parts carried by said frame and automatically operable at predetermined intervals to deliver an article to the holding part of said member, a lever carried by said frame and operable to releasably engage said member and to lock one to the other, and means yieldingly connected to said lever and automatically operable to move it to lock the frame and member together during the delivery of an article to said holder part and then to release the locking engagement to permit a relative movement of said frame and member.

71. In a machine of the class described, a movable article holder, means for moving said holder, and mechanism having parts periodically movable with said holder and operable to introduce an article into said holder and to discharge it therefrom at different predetermined points in a movement of the holder.

72. In a machine of the class described, a movable article holder, means for imparting predetermined movements thereto, and mechanism having an introducing ram and an ejecting ram periodically movable with said holder in register therewith and automatically operable to respectively introduce an article into said holder and to eject the article therefrom at different predetermined points in a movement of the holder.

73. In a machine of the class described, a movable article holder, means for imparting transverse movement to the holder axis, a frame mounted for swinging movements parallel to a portion of the movement of said holder, and mechanism for imparting predetermined movements to said frame and to periodically introduce an article into said holder and to eject an article therefrom at predetermined points in a movement of the holder.

74. In a machine of the class described, a rotatable article holder mounted for movements transverse to its axis of rotation, a frame mounted for reciprocatory movements with a portion of such movements in unison with said holder, and cam controlled mechanism operable to impart predetermined reciprocatory movements to said frame and to introduce an article into said holder and discharge the article therefrom at different predetermined points in a movement of said holder.

75. In a machine of the class described, a movable member, an article holder carried by said member, a reciprocably movable frame having a portion of its movements parallel to the movements of said member, means for imparting predetermined movements to said frame with a portion of such movements in unison with the movements of said holder, article introducing means and article ejecting means carried by said frame, and mechanism automatically operable to periodically move said introducing and ejecting means to respectively introduce an article into and discharge it from said holder at different predetermined points in a movement of said holder.

76. In a machine of the class described, an article holder, means for imparting successive orbital movements in one direction to said holder, means for moving said holder, and mechanism having parts periodically movable with said holder and operable to introduce an article into the holder and to discharge it therefrom at different predetermined points in an orbital movement of the holder.

77. In a machine of the class described, an article holder, means for imparting successive orbital movements in one direction to said holder, and mechanism having an introducing ram and an ejecting ram periodically movable with said holder in register therewith and automatically operable to respectively introduce an article into said holder and to eject the article therefrom at different predetermined points in a movement of the holder.

78. In a machine of the class described, a movable article holder, means for imparting orbital movements to the holder transverse to its axis, a frame mounted for swinging movements parallel to the portion of the orbital movement of said holder, and mechanism for imparting predetermined movements to said frame and to periodically introduce an article into said holder and to eject an article therefrom at predetermined points in a movement of the holder.

79. In a machine of the class described, a rotatable article holder mounted for orbital movements transverse to its axis of rotation, means for imparting orbital movements to said holder, a frame mounted for reciprocatory movements with a portion of such movements in unison with the orbital movements of said holder, and cam controlled mechanism operable to impart predetermined reciprocatory movements to said frame and to introduce an article into said holder and discharge the article therefrom at different predetermined points in an orbital movement of the holder.

80. In a machine of the class described, a movable member, an article carried for orbital movements by said member, a reciprocally movable frame having a portion of its movement parallel to the orbital movements of said holder, means for imparting predetermined movements to said frame with a portion of such movements in unison with the orbital movements of said holder, article introducing means and article ejecting means carried by said frame, and mechanism automatically operable to periodically move said introducing and ejecting means to respectively introduce an article into and discharge it from said holder at different predetermined points in a movement of the holder.

81. In a machine of the class described, a movable member, a hollow rotatable shaft carried by said member for movements therewith and adapted to hold an article in one end thereof, and mechanism having an article introducing ram and an article ejecting ram movable with said shaft during predetermined portions of its movement with said member and operable at different predetermined points in a movement of the shaft, one to introduce an article into holding position in said shaft and the other to pass through the shaft and eject a held article therefrom.

82. In a machine of the class described, a movable member, a hollow article holding shaft carried by said member, a frame mounted for reciprocatory movements parallel to the movement of said member, an article introducing ram and an article ejecting ram reciprocally carried by said frame in position for said article holding shaft to pass therebetween and to have different ends thereof in register with different rams at predetermined points in a movement of the shaft, and mechanism operable to impart predetermined reciprocatory movements to said frame and to periodically reciprocate said rams to cause one to introduce an article into holding position in said shaft and the other to eject an article therefrom when the shaft is in different predetermined positions of its movement.

83. In a machine of the class described, a movable member, an article holder carried by said member for movements relative thereto, mechanism having parts periodically movable with said holder and operable to introduce an article into the holder and to discharge it therefrom at different predetermined points in a movement of the holder, and means for causing said holder to stand in different positions relative to said member during the article introducing and article discharging actions of said mechanism.

84. In a machine of the class described, a movable member, an article holder carried by said member for movements relative thereto, mechanism having an introducing ram and an ejecting ram periodically movable with said holder in register therewith and automatically operable during such registering periods to respectively introduce an article into the holder and to eject it therefrom at different predetermined points in a movement of the holder, and means automatically operable to cause said holder to stand in one position relative to said member when an article is being introduced therein and to stand in a different position relative to said member when an article is being ejected therefrom.

85. In a machine of the class described, a rotatable member, an article holder carried by said member for revoluble movements therewith about its axis and for swinging movements relative thereto, mechanism operable to periodically introduce articles into said holder and to eject them therefrom at predetermined points in a movement thereof with said member, and means for causing said holder to stand in different positions relative to said member when receiving and discharging an article.

86. In a machine of the class described, a rotatable member, an article holder carried by said member for revoluble movements therewith and for swinging movements relative thereto, a frame mounted for swinging movements concentric to the revoluble movements of said holder, mechanism having parts carried by said frame and operable to periodically introduce an article into said holder and then to eject it therefrom at different predetermined points in a revolution of the holder, and means for causing said holder to stand in different positions relative to said member when articles are being introduced into and ejected therefrom.

87. In a machine of the class described, a movable article holder, and means having an ejecting ram operable to periodically register with said holder and move therewith and during such registering movement to enter and eject an article from the holder.

88. In a machine of the class described, a movable article holder, a movable frame, means operable to periodically move said frame with said holder, and means having a part carried by said frame and operable to enter and eject an article from the holder when the frame is moving in register therewith.

89. In a machine of the class described, a revolubly movable article holder, a frame mounted for swinging movements, means for swinging said frame and causing its movements to periodically coincide with the movement of said holder, and means having a ram carried by said frame and operable to move said ram to enter the holder and to eject an article therefrom when the frame is moving with the holder.

90. In a machine of the class described, a revolubly movable article holder, a frame mounted for oscillatory movements concentric to the movement of said holder, means for imparting predetermined oscillating movements to said frame to cause it to periodically register with and move in unison with said holder, means having a part carried by said frame and operable to eject an article from the holder when the frame is moving in register therewith, and means automatically operable to lock the frame and holder together during the article ejecting action.

91. In a machine of the class described, a continuously moving member, a plurality of article holders carried by said member for movements therewith, and means operable to move a portion thereof with said holders during a portion of their movements and to simultaneously introduce an article into one holder and eject an article from another holder.

92. In a machine of the class described, a moving member, a plurality of article holders carried by said member for movements therewith, and mechanism automatically operable to simultaneously introduce an article into one and eject an article from another of said holders.

93. In a machine of the class described, a moving member, a plurality of article holders carried by said member for continuous movement therewith, and mechanism automatically operable during a movement of said member to simultaneously introduce an article into one and eject an article from another of said holders.

94. In a machine of the class described, a moving member, a plurality of article holders carried by said member, a reciprocally movable frame, and mechanism having parts carried by said frame and automatically operable to move said frame and to simultaneously introduce an article into one and eject an article from another of said holders during a moving thereof.

95. In a machine of the class described, a moving member, a plurality of article holders carried by said member, a reciprocally movable frame, mechanism having parts carried by said frame and automatically operable to move said frame and to simultaneously introduce an article into one and eject an article from another of said holders during a moving thereof, and means automatically operable to lock said frame and member together during the article introducing and ejecting periods.

96. In a machine of the class described, a moving member, a plurality of article holders carried by said member, a reciprocally movable frame, mechanism having parts carried by said frame and automatically operable to move said frame and to simultaneously introduce an article into one and eject an article from another of said holders during a moving thereof.

97. In a machine of the class described, a rotatable member, a plurality of article holders carried by said member in circular series around its axis, a frame mounted for swinging movements concentric to the axis of said member, means for imparting predetermined swinging movements to said frame, and mechanism partly carried by said frame and automatically operable during forward movements of the frame with said members to introduce an article into the preceding holder of the set from which holder an article was ejected during the preceding forward movement of the frame.

98. In a machine of the class described, a rotatable member, a plurality of article holders carried by said member in circular series around its axis, a frame mounted for swinging movements concentric to the axis of said member, means for imparting predetermined swinging movements to said frame, and mechanism having an article introducing ram and an article ejecting ram carried by said frame at opposite sides of the path of movement of said holder and automatically operable at each forward stroke of the frame to simultaneously move said rams in opposite directions to act on adjoining holders to introduce an article into one and eject an article from the other.

99. In a machine of the class described, a rotatable member, a plurality of article holders carried by said member in circular series around its axis, a frame mounted for swinging movements concentric to the axis of said member, means for imparting predetermined swinging movements to said frame, mechanism having an article introducing ram and an article ejecting ram carried by said frame at opposite sides of the path of movement of said holders and automatically operable at each forward stroke of the frame to simultaneously move said rams in opposite directions to act on adjoining holders to introduce an article into one and eject an article from the other, and means automatically operable to lock said frame and member together during the article introducing and ejecting operation of said mechanism.

100. In a machine of the class described, a revoluble article holder, and mechanism having means periodically actuated to move in unison with the holder and to introduce an article into said holder and to discharge it therefrom at different predetermined points in a movement of the holder and while the means are moving therewith.

101. In a machine of the class described, a revoluble article holder, a frame mounted for swinging movements at a side of the path of movement of said holder, and mechanism operable to swing said arm and having means carried by the arm and periodically movable by the arm in unison with said holder and operable to introduce an article into said holder and to discharge it therefrom at different predetermined points in a movement of the holder while the arm is moving therewith.

102. In a machine of the class described, a pair of article holders mounted for revoluble movements together, and means operable to move portions thereof with said holders during predetermined portions of their movement and to introduce an article into one holder and eject an article from the other holder while moving in unison with the holders.

103. In a machine of the class described, a continuously moving member, a pair of article holders carried by said member, and means having a portion operable to periodically move in unison with said holders and while moving therewith to introduce an article into one holder and to eject an article from the other holder.

104. In a machine of the class described, a moving member, a pair of article holders carried by said member, a reciprocably movable frame, and mechanism having parts carried by said frame and automatically operable to reciprocate the frame with the movement thereof in one direction in synchronism with the movement of said member and to introduce an article into one and eject an article from the other of said holders during the synchronous movement of the frame therewith.

105. In a machine of the class described, a moving member, a pair of article holders carried by said member, a reciprocally movable frame, mechanism having parts carried by said frame and automatically operable to reciprocate the frame with the movement thereof in one direction in unison with the movement of said member and to introduce an article into one and eject an article from the other of said holders during the movement of the frame with said member, and means automatically operable to lock the frame and member together during the article introducing and ejecting periods.

106. In a machine of the class described, a moving member, a pair of article holders carried by said member, a reciprocably movable frame, and mechanism having parts carried by said frame and automatically operable to periodically move said frame in unison with said member and to introduce an article into one and eject an article from the other of said holders during the unitary movement of the member and frame.

107. In a machine of the class described, a driven shaft mounted for revoluble swinging movements to different substantially parallel axes and having an article holder in one end, a plurality of grinding elements with which the article carried by said holder coacts at different predetermined points in a revolution of said shaft, and means for imparting different predetermined swinging movements to said shaft when adjacent to successive of said elements.

In testimony whereof, I have hereunto signed my name to this specification.

WILLIAM EMIL BOCK.